US012627551B2

(12) United States Patent     (10) Patent No.:   US 12,627,551 B2
Xin et al.             (45) Date of Patent:    \*May 12, 2026

(54) DATA TRANSMISSION METHOD, DATA MODULATION METHOD, ELECTRONIC DEVICE, AND STORAGE MEDIUM

(71) Applicant: ZTE CORPORATION, Shenzhen (CN)

(72) Inventors: Yu Xin, Shenzhen (CN); Guanghui Yu, Shenzhen (CN); Tong Bao, Shenzhen (CN); Jin Xu, Shenzhen (CN); Liujun Hu, Shenzhen (CN)

(73) Assignee: ZTE CORPORATION, Shenzhen (CN)

( \* ) Notice: Subject to any disclaimer, the term of this patent is extended or adjusted under 35 U.S.C. 154(b) by 110 days.

This patent is subject to a terminal disclaimer.

(21) Appl. No.: 18/696,691

(22) PCT Filed: Sep. 28, 2022

(86) PCT No.: PCT/CN2022/122063
§ 371 (c)(1),
(2) Date: Mar. 28, 2024

(87) PCT Pub. No.: WO2023/051592
PCT Pub. Date: Apr. 6, 2023

(65) Prior Publication Data
US 2024/0388490 A1     Nov. 21, 2024

(30) Foreign Application Priority Data
Sep. 29, 2021    (CN) .......................... 202111154475.2

(51) Int. Cl.
*H04L 27/26*     (2006.01)
*H04B 1/04*      (2006.01)
*H04L 5/00*      (2006.01)

(52) U.S. Cl.
CPC ....... *H04L 27/2634* (2013.01); *H04B 1/0475* (2013.01); *H04L 5/001* (2013.01); *H04L 27/2644* (2013.01)

(58) Field of Classification Search
CPC . H04L 27/2634; H04L 5/001; H04L 27/2644; H04L 5/0007; H04L 5/0044;
(Continued)

(56) References Cited

U.S. PATENT DOCUMENTS 5,666,383 A \* 9/1997 Huang .................. H04L 5/0044
                                                  375/220
7,609,611 B1 \* 10/2009 Siohan .................... H04J 4/005
                                                  370/208
(Continued)

FOREIGN PATENT DOCUMENTS

CN       109729033 A     5/2019
CN       110249598 A     9/2019
(Continued)

OTHER PUBLICATIONS

International Search Report in Application No. PCT/CN2022/122063, dated Dec. 7, 2022, 4 pages, including translation.
(Continued)

*Primary Examiner* — Emmanuel Bayard
(74) *Attorney, Agent, or Firm* — Morgan, Lewis & Bockius LLP

(57) ABSTRACT

Provided are a data transmission method, a data modulation method, an electronic device and a storage medium. The data transmission method includes: transmitting to-be-transmitted data in N frequency domain resource blocks, where each frequency domain resource block includes K(n) subcarriers, where n=1, 2, . . . , N, a value of N is greater than or equal to 1, and a value of K(n) is greater than or equal to 1; performing inverse Fourier transform and multiplication
(Continued)

operation processing on to-be-transmitted data on the each frequency domain resource block of the N frequency domain resource blocks to form N groups of data sequences; and transmitting the N groups of data sequences.

18 Claims, 6 Drawing Sheets

(58) Field of Classification Search
CPC ............ H04L 27/2602; H04L 27/2633; H04B 1/0475
USPC .................................. 375/260, 295, 207, 299
See application file for complete search history.

(56) References Cited

U.S. PATENT DOCUMENTS

| | | | | |
|---|---|---|---|---|
| 12,513,034 | B2* | 12/2025 | Xin | H04L 27/26 |
| 2005/0117670 | A1* | 6/2005 | Webster | H04L 27/2602 |
| | | | | 375/330 |
| 2009/0154442 | A1* | 6/2009 | Kang | H03M 1/70 |
| | | | | 370/344 |
| 2013/0034089 | A1* | 2/2013 | Nakashima | H04W 72/21 |
| | | | | 370/336 |
| 2014/0233664 | A1* | 8/2014 | Abdoli | H04L 27/2634 |
| | | | | 375/261 |
| 2021/0281453 | A1* | 9/2021 | Ota | H04B 1/10 |
| 2025/0039029 | A1* | 1/2025 | Xin | H04L 27/2602 |

FOREIGN PATENT DOCUMENTS

| | | | |
|---|---|---|---|
| CN | 111901877 | A | 11/2020 |
| CN | 113346988 | A | 9/2021 |
| EP | 4373042 | A1 | 5/2024 |
| WO | WO-2021098426 | A1 | 5/2021 |

OTHER PUBLICATIONS

Nadal et al., "Novel UF-OFDM Transmitter: Significant Complexity Reduction Without Signal Approximation", IEEE Transactions on Vehicular Technology, IEEE, USA, vol. 67, No. 3, Mar. 1, 2018, pp. 2141-2154, XP011679452, ISSN: 0018-9545, DOI: 10.1109/TVT.2017.2764379.

Cewit et al., "flexi-OFDMA, a new waveform for NR", 3GPP TSG-RAN WG1 Meeting #86b, R1-1610309, Oct. 10-14, 2016, XP051150324, URL: http://www.3gpp.org/ftp/Meetings_3GPP_SYNC/RAN1/Docs/.

Extended European Search Report in Application No. 22874976.8 dated Jul. 21, 2025, 9 pages.

* cited by examiner

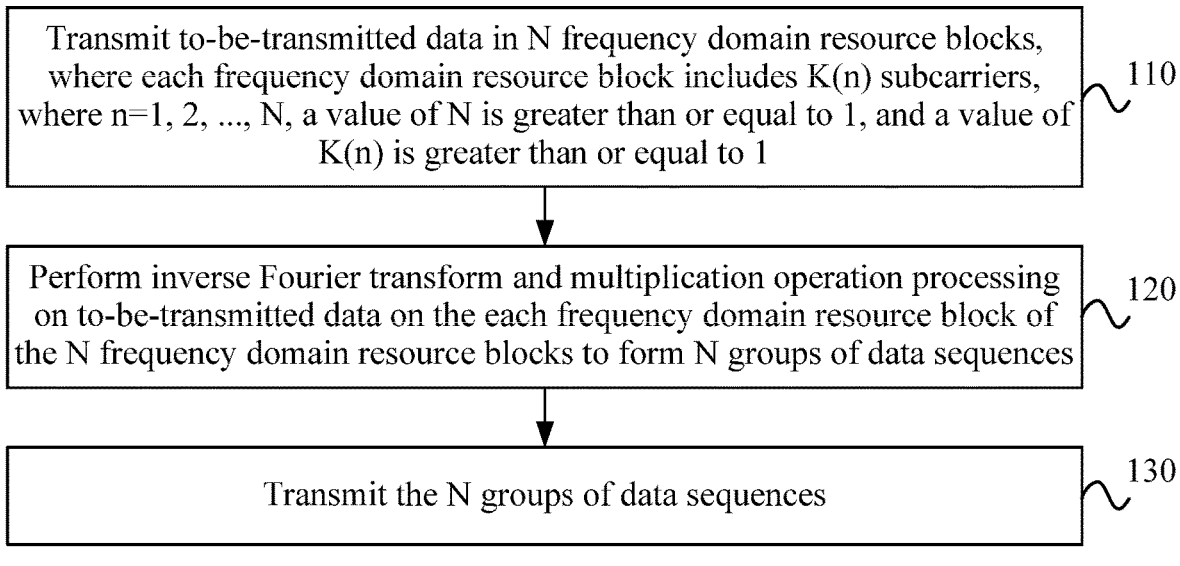

Transmit to-be-transmitted data in N frequency domain resource blocks, where each frequency domain resource block includes K(n) subcarriers, where n=1, 2, ..., N, a value of N is greater than or equal to 1, and a value of K(n) is greater than or equal to 1 ∿110

Perform inverse Fourier transform and multiplication operation processing on to-be-transmitted data on the each frequency domain resource block of the N frequency domain resource blocks to form N groups of data sequences ∿120

Transmit the N groups of data sequences ∿130

FIG. 1

Transmit to-be-transmitted data in N frequency domain resource blocks, where each frequency domain resource block includes K(n) subcarriers, where n=1, 2, ..., N, a value of N is greater than or equal to 1, and a value of K(n) is greater than or equal to 1 ∿210

Perform inverse Fourier transform and multiplication operation processing on to-be-transmitted data on the each frequency domain resource block of the N frequency domain resource blocks to form N groups of data sequences ∿220

In the case where N is greater than 1, add the N groups of data sequences as a first data sequence; and transmit the first data sequence ∿230

FIG. 2

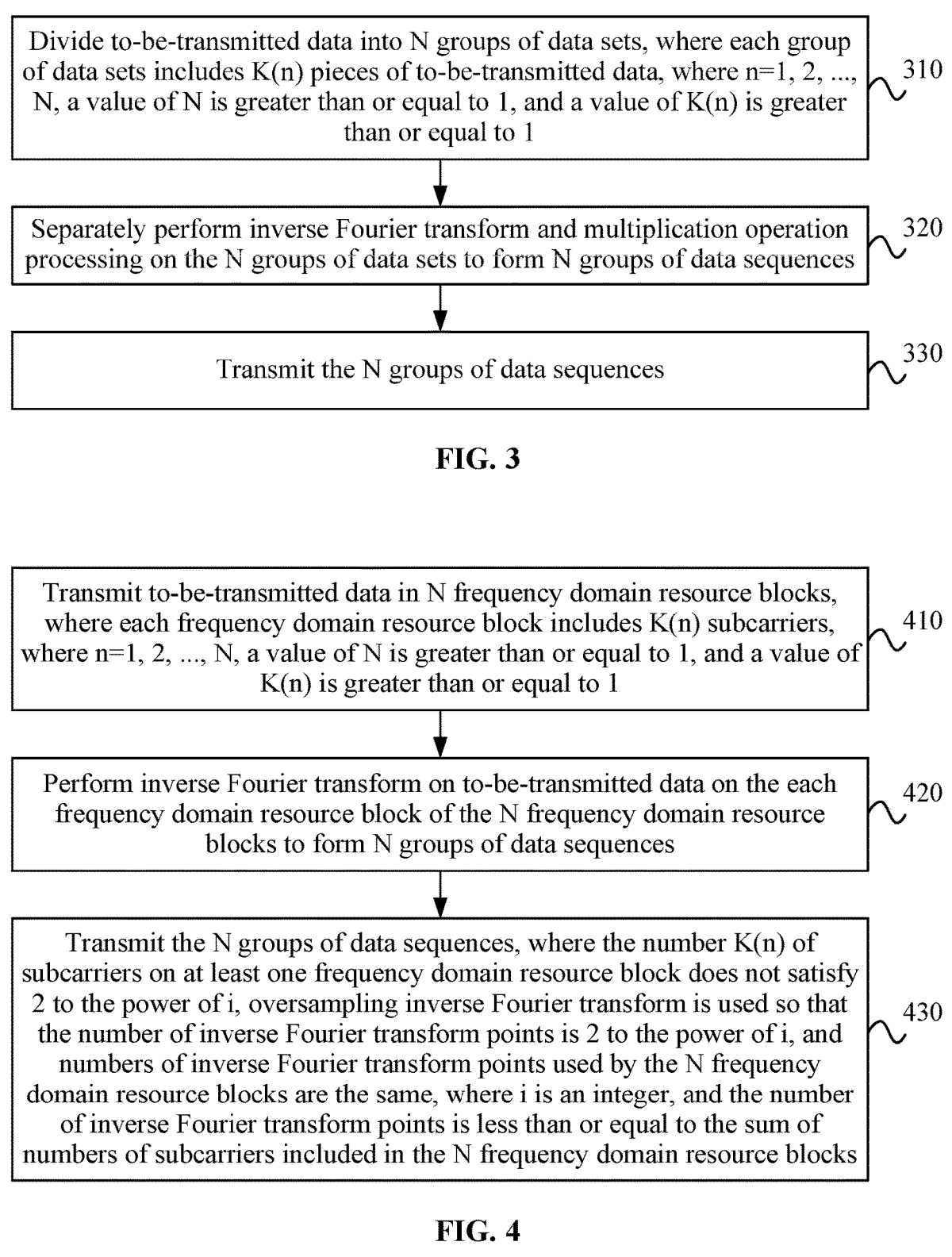

Divide to-be-transmitted data into N groups of data sets, where each group of data sets includes K(n) pieces of to-be-transmitted data, where n=1, 2, ..., N, a value of N is greater than or equal to 1, and a value of K(n) is greater than or equal to 1 ~310

Separately perform inverse Fourier transform and multiplication operation processing on the N groups of data sets to form N groups of data sequences ~320

Transmit the N groups of data sequences ~330

FIG. 3

Transmit to-be-transmitted data in N frequency domain resource blocks, where each frequency domain resource block includes K(n) subcarriers, where n=1, 2, ..., N, a value of N is greater than or equal to 1, and a value of K(n) is greater than or equal to 1 ~410

Perform inverse Fourier transform on to-be-transmitted data on the each frequency domain resource block of the N frequency domain resource blocks to form N groups of data sequences ~420

Transmit the N groups of data sequences, where the number K(n) of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same, where i is an integer, and the number of inverse Fourier transform points is less than or equal to the sum of numbers of subcarriers included in the N frequency domain resource blocks ~430

DATA TRANSMISSION METHOD, DATA MODULATION METHOD, ELECTRONIC DEVICE, AND STORAGE MEDIUM

CROSS REFERENCE TO RELATED APPLICATIONS

This is a National Stage Application filed under 35 U.S.C. 371 based on International Patent Application No. PCT/CN2022/122063, filed on Sep. 28, 2022, which claims priority to Chinese Patent Application No. 202111154475.2 filed on Sep. 29, 2021, disclosures of both of which are incorporated herein by reference in their entireties.

TECHNICAL FIELD

The present application relates to the field of wireless communication technology, for example, a data transmission method, a data modulation method, an electronic device and a storage medium.

BACKGROUND

Long Term Evolution (LTE) technology is the fourth generation of wireless cellular communication technology. LTE technology adopts orthogonal frequency division multiplexing (OFDM) technology, and time-frequency resources composed of subcarriers and OFDM symbols form wireless physical time-frequency resources of the LTE system. OFDM technology is used together with cyclic prefixes (CPs) in wireless communication, so that the problem of multipath delay is effectively solved, and frequency-selective channels can be divided into a set of parallel flat channels. However, due to the relatively large spectrum leakage in the cyclic prefix-orthogonal frequency division multiplexing (CP-OFDM) system, inter-subband interference is likely to occur. The solution is to use guard intervals in the frequency domain, which, however, will result in a decrease in spectral efficiency. In the fifth generation of communication technology, CP-OFDM is still used as the basic waveform, and different parameter sets may be used between two adjacent subbands, which, however, will cause the orthogonality between subcarriers to be disrupted, leading to new interference problems. The solution to this interference problem is to insert a guard bandwidth between two transmission bandwidths with different parameter sets, but a problem of frequency resource waste exists. Due to the vast frequency band range and diverse deployment manners used in the future sixth generation of communication technology, not only multi-bandwidth channels are required, but also waveform schemes that satisfy different scenarios are required. How to uniformly transmit and apply these waveform schemes becomes a research focus in the future of business.

SUMMARY

Embodiments of the present application provide a data transmission method, a data modulation method, an electronic device and a storage medium.

The embodiments of the present application provide a data transmission method. The data transmission method includes: transmitting to-be-transmitted data in N frequency domain resource blocks, where each frequency domain resource block includes K(n) subcarriers, where n=1, 2, . . . , N, a value of N is greater than or equal to 1, and a value of K(n) is greater than or equal to 1; performing inverse Fourier transform and multiplication operation processing on to-be-transmitted data on the each frequency domain resource block of the N frequency domain resource blocks to form N groups of data sequences; and transmitting the N groups of data sequences.

The embodiments of the present application further provide a data modulation method. The method includes: dividing to-be-transmitted data into N groups of data sets, where each group of data sets includes K(n) pieces of to-be-transmitted data, where n=1, 2, . . . , N, a value of N is greater than or equal to 1, and a value of K(n) is greater than or equal to 1; separately performing inverse Fourier transform and multiplication operation processing on the N groups of data sets to form N groups of data sequences; and transmitting the N groups of data sequences.

The embodiments of the present application further provide a data transmission method. The method includes: transmitting to-be-transmitted data in N frequency domain resource blocks, where each frequency domain resource block includes K(n) subcarriers, where n=1, 2, . . . , N, a value of N is greater than or equal to 1, and a value of K(n) is greater than or equal to 1; performing inverse Fourier transform on to-be-transmitted data on the each frequency domain resource block of the N frequency domain resource blocks to form N groups of data sequences; and transmitting the N groups of data sequences. The number K(n) of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same, where i is an integer, and the number of inverse Fourier transform points is less than or equal to the sum of numbers of subcarriers included in the N frequency domain resource blocks.

The embodiments of the present application further provide an electronic device. The electronic device includes at least one processor and a memory configured to store at least one program. When executed by the at least one processor, the at least one program causes the at least one processor to perform the data transmission method according to any embodiment of the present application.

The embodiments of the present application further provide an electronic device. The electronic device includes at least one processor and a memory configured to store at least one program. When executed by the at least one processor, the at least one program causes the at least one processor to perform the data modulation method according to any embodiment of the present application.

The embodiments of the present application further provide a computer-readable storage medium. The computer-readable storage medium is configured to store at least one program executable by at least one processor to perform the data transmission method according to any embodiment of the present application or the data modulation method according to any embodiment of the present application.

BRIEF DESCRIPTION OF DRAWINGS

FIG. 1 is a flowchart of a data transmission method according to an embodiment of the present application;

FIG. 2 is a flowchart of another data transmission method according to an embodiment of the present application;

FIG. 3 is a flowchart of a data modulation method according to an embodiment of the present application;

FIG. 4 is a flowchart of a data transmission method according to an embodiment of the present application;

DETAILED DESCRIPTION

Figure 5:
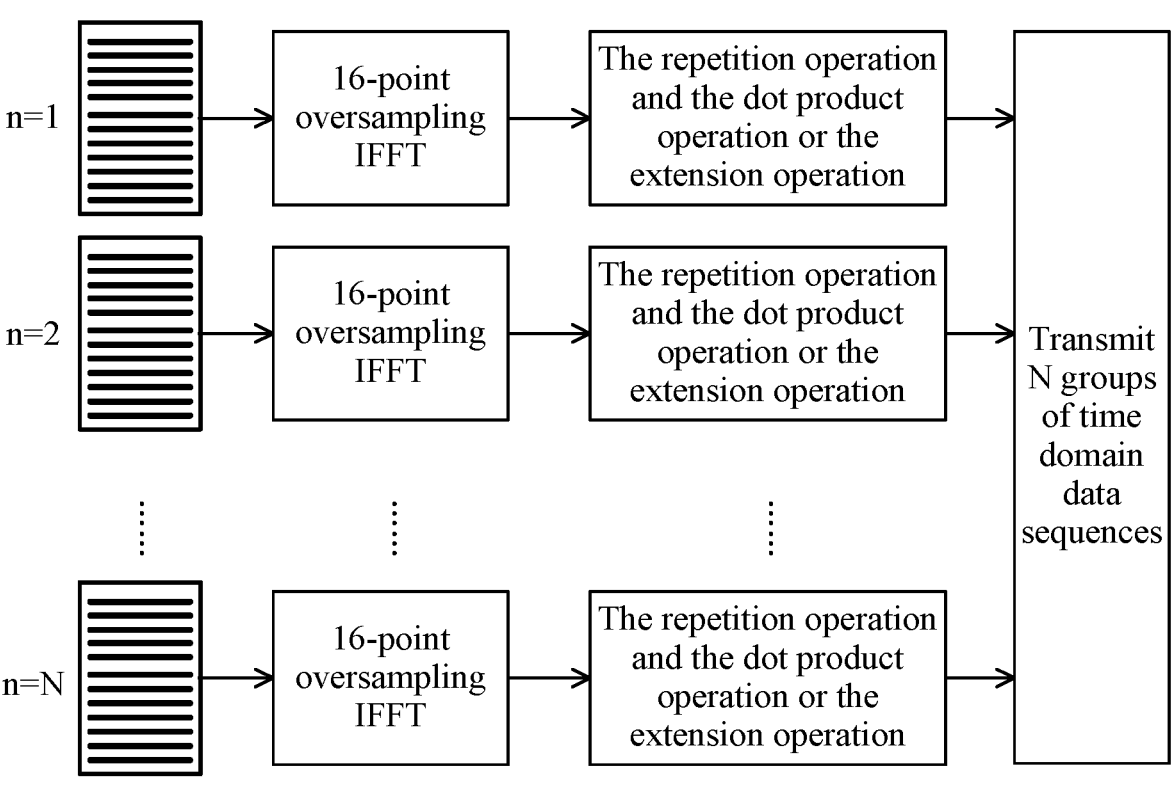
FIG. 5 is an example diagram of a data transmission method according to an embodiment of the present application.

It is to be understood that embodiments described herein are merely intended to explain the present application and not to limit the present application.

Suffixes such as "module", "component" or "unit" used for indicating elements in the subsequent description are merely used for facilitating the description of the present application and have no particular meaning in themselves. Therefore, "module", "component" or "unit" may be used in a mixed manner.

FIG. 1 is a flowchart of a data transmission method according to an embodiment of the present application. The embodiment of the present application is applicable to the case of data transmission, and the method may be executed by a base station or terminal device. The apparatus may be implemented by software and/or hardware. Referring to FIG. 1, the method provided in the embodiment of the present application includes the following.

In 110, to-be-transmitted data is transmitted in N frequency domain resource blocks, where each frequency domain resource block includes $K(n)$ subcarriers, where $n=1, 2, \ldots, N$, a value of N is greater than or equal to 1, and a value of $K(n)$ is greater than or equal to 1.

The to-be-transmitted data is information that can be transmitted in the frequency domain. The to-be-transmitted data may include information data, reference signal data or control data. The frequency domain resource block may be formed by one or more contiguous or non-contiguous subcarriers in the frequency domain.

In the embodiment of the present application, the to-be-transmitted data may be transmitted in the frequency domain resource blocks formed by one or more subcarriers.

In 120, inverse Fourier transform and multiplication operation processing are performed on to-be-transmitted data on the each frequency domain resource block of the N frequency domain resource blocks to form N groups of data sequences.

The inverse Fourier transform may be the processing of converting frequency domain signals into time domain signals, and the multiplication operation may be the processing of performing a dot product operation on the to-be-transmitted data on each frequency domain resource block. Each piece of to-be-transmitted data may be multiplied by an element in a to-be-multiplied sequence.

The inverse Fourier transform and the dot product operation may be performed on one or more frequency domain resource blocks carrying the to-be-transmitted data so that N groups of generated data sequences are acquired.

In 130, the N groups of data sequences are transmitted.

One or more generated data sequences may be transmitted.

In the embodiment of the present application, the to-be-transmitted data is transmitted in the N frequency domain resource blocks, each frequency domain resource block includes $K(n)$ subcarriers, the inverse Fourier transform and the dot product operation are separately performed on the to-be-transmitted data on the each frequency domain resource block of the N frequency domain resource blocks so that N groups of data sequences are generated, and the N groups of generated data sequences are transmitted. In this manner, the common use of multiple frequency domain resource blocks is achieved, so that the utilization of frequency domain resources can be improved.

On the basis of the preceding embodiment of the present application, the to-be-multiplied sequence used in the multiplication operation processing includes a sequence of values of which moduli are equal and phases sequentially change by the same $\theta(n)$, where different frequency domain resource blocks correspond to different values of $\theta(n)$.

The to-be-multiplied sequence may be a data sequence used by the dot product operation in the dot product operation of the to-be-transmitted data. Elements included in the data sequence have equal moduli, and phases between elements sequentially change by $\theta(n)$.

In other words, the to-be-multiplied sequence is $\exp(j*\theta(n)*i)$. $j$ denotes the symbol of the imaginary number, and $i$ denotes the sequence number of each element in the to-be-multiplied sequence.

In the embodiment of the present application, in the dot product operation processing, the dot product operation may be separately performed on the to-be-transmitted data on each frequency domain resource block and the to-be-multiplied sequence, elements in the to-be-multiplied sequence used in the dot product operation with the to-be-transmitted data on each frequency domain resource block have equal moduli, and phases sequentially change by $\theta(n)$. To-be-multiplied sequences used in the dot product operation with different frequency domain resource blocks may have different $\theta(n)$.

On the basis of the preceding embodiment of the present application, before the dot product operation processing is performed on the to-be-transmitted data on the each frequency domain resource block of the N frequency domain resource blocks, the method further includes performing a data repetition operation on the to-be-transmitted data subjected to the inverse Fourier transform.

The data repetition operation is an operation that can cause the to-be-transmitted data to be repeated multiple times. For example, the sequence of the to-be-transmitted data is (a1, a2, a3, a4), and the to-be-transmitted data subjected to the data repetition operation may be (a1, a1, a2, a2, a3, a3, a4, a4).

In the embodiment of the present application, after the to-be-transmitted data on each frequency domain resource block is subjected to the inverse Fourier transform, the data repetition operation may be performed on the to-be-transmitted data subjected the inverse Fourier transform so that the time domain sampling rate is increased.

On the basis of the preceding embodiment of the present application, the multiplication operation processing includes multiplying the to-be-transmitted data subjected to the inverse Fourier transform by each element in a to-be-multiplied sequence.

The multiplication operation processing may refer to multiplying one or more pieces of data generated through the inverse Fourier transform by each element in the to-be-multiplied sequence.

On the basis of the preceding embodiment of the present application, the multiplication operation processing includes performing a windowing operation on the to-be-transmitted data by using a waveform function.

In the embodiment of the present application, the multiplication operation may refer to separately multiplying the to-be-transmitted data on the N frequency domain resource blocks by a waveform function in the manner of windowing. To-be-transmitted data on different frequency domain resource blocks may use the same or different waveform functions.

On the basis of the preceding embodiment of the present application, before the multiplication operation processing is performed on the to-be-transmitted data on the each frequency domain resource block of the N frequency domain resource block, the method further includes performing a filtering operation on the to-be-transmitted data.

Filtering may be an operation of filtering out characteristic band frequencies in a signal to prevent signal interference.

Before the to-be-transmitted data on each frequency domain resource block is processed by using the multiplication operation, the filtering operation may further be performed on the to-be-transmitted data.

On the basis of the preceding embodiment of the present application, the filtering operation includes polyphaser filtering.

Data repetition may be performed on the to-be-transmitted data on each frequency domain resource block of the N frequency domain resource blocks, then the polyphaser filtering is performed on to-be-transmitted data subjected to the data repetition, and the dot product operation may be performed after the polyphaser filtering.

On the basis of the preceding embodiment of the present application, in the case where the filtering operation is the polyphaser filtering, the number R of repetitions of the data repetition operation is 2 to the power of i, where i is an integer greater than or equal to 0.

In the embodiment of the present application, when the polyphaser filtering is performed on the to-be-transmitted data on each frequency domain resource block of the N frequency domain resource blocks, correspondingly, the data repetition operation of which the number of repetitions is R may be performed on the to-be-transmitted data, where the number R of repetitions is 2 to the power of i. It is to be understood that data repeated once may refer to that data is transmitted once, that is, the data is not repeatedly transmitted; data repeated R times may refer to that data is transmitted R times.

On the basis of the embodiment of the preceding application, before the multiplication operation processing is performed on the to-be-transmitted data, an upsampling operation is further included.

The data repetition operation may not be performed on the to-be-transmitted data, and the upsampling operation may be used for extending the to-be-transmitted data.

On the basis of the embodiment of the present application, the filtering in the filtering operation is time domain convolutional filtering.

On the basis of the preceding embodiment of the present application, a sampling multiple of the upsampling operation is 2 to the power of i.

FIG. 2 is a flowchart of another data transmission method according to an embodiment of the present application. The embodiment of the present application is an explanation based on the preceding embodiments of the present application. Referring to FIG. 2, the method provided in the embodiment of the present application includes the following.

In 210, to-be-transmitted data is transmitted in N frequency domain resource blocks, where each frequency domain resource block includes K(n) subcarriers, where n=1, 2, . . . , N, a value of N is greater than or equal to 1, and a value of K(n) is greater than or equal to 1.

In 220, inverse Fourier transform and multiplication operation processing are performed on to-be-transmitted data on the each frequency domain resource block of the N frequency domain resource blocks to form N groups of data sequences.

In 230, in the case where N is greater than 1, the N groups of data sequences are added as a first data sequence; and the first data sequence is transmitted.

In the embodiment of the present application, in the case where the number of generated data sequences is greater than 1, the generated N groups of data sequences may be added as the first data sequence, and the generated first data sequence may be transmitted.

On the basis of the preceding embodiment of the present application, the method further includes performing a filtering operation or a windowing operation on the first data sequence.

In the embodiment of the present application, the filtering operation or the windowing operation may be performed on the first data sequence. For example, polyphaser filtering may be performed on the first data sequence, and the first data sequence may be multiplied by a waveform function to achieve the windowing operation.

On the basis of the preceding embodiment of the present application, the ratio between subcarrier spacing of any two frequency domain resource blocks satisfies 2 to the power of i, where i is an integer.

In the N frequency domain resource blocks, the ratio between subcarrier spacing of any two frequency domain resource blocks satisfies 2 to the power of i, and i is an integer. In the case where the value of i is zero, the subcarrier spacing of the N frequency domain resource blocks is equal. In the case where the value of i is not zero, the subcarrier spacing of the N frequency domain resource blocks is different.

On the basis of the preceding embodiment of the present application, the ratio between spectrum bandwidths of any two frequency domain resource blocks satisfies 2 to the power of i, where i is an integer.

In the embodiment of the present application, the ratio between spectrum bandwidths of any two frequency domain resource blocks of the N frequency domain resource blocks may be 2 to the power of i. In the case where the value of i is zero, spectrum bandwidths of the N frequency domain resource blocks are the same. In the case where the value of i is not zero, spectrum bandwidths of the N frequency domain resource blocks are different.

On the basis of the preceding embodiment of the present application, the ratio between numbers of subcarriers of any two frequency domain resource blocks satisfies 2 to the power of i, where i is an integer.

In the embodiment of the present application, the ratio between the numbers of subcarriers included in any two frequency domain resource blocks of the N frequency domain resource blocks may satisfy 2 to the power of i. In the case where the value of i is zero, numbers of subcarriers included in the N frequency domain resource blocks are the same. In the case where the value of i is not zero, numbers of subcarriers included in the N frequency domain resource blocks are different.

On the basis of the preceding embodiment of the present application, among the N frequency domain resource blocks, spectrum spacing of adjacent frequency domain resource blocks is equal.

On the basis of the preceding embodiment of the present application, the spectrum bandwidths of the N frequency domain resource blocks are equal.

On the basis of the preceding embodiment of the present application, the numbers of subcarriers included in the N frequency domain resource blocks are equal.

On the basis of the preceding embodiment of the present application, the subcarrier spacing of the N frequency domain resource blocks is equal.

On the basis of the preceding embodiment of the present application, among the N frequency domain resource blocks, the spectrum spacing of adjacent frequency domain resource blocks is not equal.

On the basis of the preceding embodiment of the present application, the spectrum bandwidths of the N frequency domain resource blocks are not equal.

The spectrum bandwidths of the N frequency domain resource blocks are not equal, and when the data repetition operation is performed on the to-be-transmitted data on each frequency domain resource block of the N frequency domain resource blocks, numbers of repetitions of the to-be-transmitted data on the N frequency domain resource blocks may be different.

On the basis of the preceding embodiment of the present application, the numbers of subcarriers included in the N frequency domain resource blocks are not equal.

On the basis of the preceding embodiment of the present application, the subcarrier spacing of the N frequency domain resource blocks is not equal.

On the basis of the preceding embodiment of the present application, the value of the number of inverse Fourier transform points of the inverse Fourier transform is greater than or equal to K(n).

The number of inverse Fourier transform points of the inverse Fourier transform performed on the to-be-transmitted data on each frequency domain resource block is greater than or equal to the number of subcarriers included in the each frequency domain resource block.

On the basis of the preceding embodiment of the present application, the number of inverse Fourier transform points of the inverse Fourier transform is 2 to the power of i, where i is an integer.

The number of inverse Fourier transform points used by the to-be-transmitted data on each frequency domain resource block is 2 to the power of i.

On the basis of the preceding embodiment of the present application, the number K(n) of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same.

In the embodiment of the present application, the number K(n) of subcarriers included in one or more frequency domain resource blocks of the N frequency domain resource blocks does not satisfy 2 to the power of i, and the oversampling inverse Fourier transform may be performed on the to-be-transmitted data on the one or more frequency domain resource blocks so that the number of inverse Fourier transform points used by the one or more frequency domain resource blocks satisfies 2 to the power of i, and the numbers of inverse Fourier transform points used by the N frequency domain resource blocks are the same.

On the basis of the preceding embodiment of the present application, separately performing the inverse Fourier transform on the to-be-transmitted data on the N frequency domain resource blocks includes the following. In the case where subcarrier spacing of the N frequency domain resource blocks is equal, but numbers of subcarriers included in the N frequency domain resource blocks are not equal, oversampling inverse Fourier transform is used so that the number of inverse Fourier transform points is 2 to the power of i, and numbers of inverse Fourier transform points used by the N frequency domain resource blocks are the same.

In the case where the subcarrier spacing of the N frequency domain resource blocks is equal, but the numbers of subcarriers included in the N frequency domain resource blocks are different, the oversampling inverse Fourier transform is performed on the to-be-transmitted data on the N frequency domain resource blocks so that the number of used inverse Fourier transform points is 2 to the power of i, the numbers of inverse Fourier transform points used by the N frequency domain resource blocks are the same, and sequence lengths of the N groups of data sequences formed by the inverse Fourier transform are the same.

The number of inverse Fourier transform points of the inverse Fourier transform is less than or equal to the sum of the numbers of subcarriers included in the N frequency domain resource blocks.

In the embodiment of the present application, the number of inverse Fourier transform points used for the inverse Fourier transform performed on the to-be-transmitted data on each frequency domain resource block is less than or equal to the sum of the numbers of subcarriers included in the N frequency domain resource blocks.

On the basis of the preceding embodiment of the present application, the number of inverse Fourier transform points of the inverse Fourier transform is less than or equal to two times the number of subcarriers included in the each frequency domain resource block.

In the embodiment of the present application, the number of inverse Fourier transform points used for the inverse Fourier transform performed on the to-be-transmitted data on each frequency domain resource block is less than or equal to two times the number of subcarriers included in each frequency domain resource block.

Before the inverse Fourier transform is performed on the to-be-transmitted data on the N frequency domain resource blocks, Fourier transform is performed on the to-be-transmitted data on at least one frequency domain resource block.

Before the inverse Fourier transform is performed on the to-be-transmitted data on the N frequency domain resource blocks, Fourier transform is performed on the to-be-transmitted data on the N frequency domain resource blocks.

Before the Fourier transform is performed on the to-be-transmitted data on the N frequency domain resource blocks, numbers of pieces of to-be-transmitted data on the N frequency domain resource blocks are equal.

Before the Fourier transform is performed on the to-be-transmitted data on the N frequency domain resource blocks, the numbers of pieces of to-be-transmitted data on the N frequency domain resource blocks are not equal, and numbers of fast Fourier transform (FFT) points used for the Fourier transform performed on the to-be-transmitted data on the N frequency domain resource blocks are not equal, but the numbers of inverse fast Fourier transform (IFFT) points used for the inverse Fourier transform performed on the to-be-transmitted data on the N frequency domain resource blocks are equal.

On the basis of the preceding embodiment of the present application, a cyclic prefix (CP) is added to the data sequence formed by the to-be-transmitted data on each frequency domain resource block.

On the basis of the preceding embodiment of the present application, a guard interval (GI) is added to the data sequence formed by the to-be-transmitted data on each frequency domain resource block, where the guard interval is null data.

The guard interval may be added to the data sequence, and the guard interval may be null data.

On the basis of the preceding embodiment of the present application, the to-be-transmitted data includes constellation modulation data or reference signal data.

On the basis of the preceding embodiment of the present application, a filtering function for filtering includes: a root-raised-cosine function, a raised-cosine function, a rectangular function or an isotropic orthogonal transform function.

FIG. 3 is a flowchart of a data modulation method according to an embodiment of the present application. The embodiment of the present application is applicable to the case of data transmission, and the method may be executed by a base station or terminal device. The apparatus may be implemented by software and/or hardware. Referring to FIG. 3, the method provided in the embodiment of the present application includes the following.

In 310, to-be-transmitted data is divided into N groups of data sets, where each group of data sets includes K(n) pieces of to-be-transmitted data, where n=1, 2, . . . , N, a value of N is greater than or equal to 1, and a value of K(n) is greater than or equal to 1.

The to-be-transmitted data is information that can be transmitted in the frequency domain. The to-be-transmitted data may include information data, reference signal data or control data. The data set may include one or more pieces of to-be-transmitted data. Numbers of pieces of to-be-transmitted data included in different data sets may be the same or different.

In the embodiment of the present application, the to-be-transmitted data may be divided into N groups of data sets, each group of data sets may include K(n) pieces of to-be-transmitted data. It is to be understood that values of K(n) of different data sets may be the same or different.

In 320, inverse Fourier transform and multiplication operation processing are separately performed on the N groups of data sets to form N groups of data sequences.

The inverse Fourier transform and a dot product operation may be performed on the data set including one or more pieces of to-be-transmitted data so that N groups of generated data sequences are acquired.

In 330, the N groups of data sequences are transmitted.

One or more generated data sequences may be transmitted.

On the basis of the preceding embodiment of the present application, a to-be-multiplied sequence used in the multiplication operation includes a sequence of values of which moduli are equal and phases sequentially change by the same $\theta(n)$, where different data sets correspond to different values of $\theta(n)$.

The to-be-multiplied sequence may be a data sequence used by the dot product operation in the dot product operation of the to-be-transmitted data. Elements included in the data sequence have equal moduli, and phases between elements sequentially change by $\theta(n)$.

In other words, the to-be-multiplied sequence is $\exp(j*\theta(n)*i)$. j denotes the symbol of the imaginary number, and i denotes the sequence number of each element in the to-be-multiplied sequence.

When the multiplication operation processing is performed on the to-be-transmitted data in the N groups of data sets, the dot product operation may be separately performed on the to-be-transmitted data in each group of data sets and the to-be-multiplied sequence, elements in the to-be-multiplied sequence used in the dot product operation with the to-be-transmitted data in each group of data sets have equal moduli, and phases sequentially change by $\theta(n)$. To-be-multiplied sequences used in the dot product operation with different groups of data sets may have different $\theta(n)$.

On the basis of the preceding embodiment of the present application, before the multiplication operation processing is separately performed on the N groups of data sets, the method further includes performing a data repetition operation on the N groups of data sets subjected to the inverse Fourier transform.

The data repetition operation is an operation that can cause the to-be-transmitted data to be repeated multiple times. For example, the sequence of the to-be-transmitted data is (a1, a2, a3, a4), and the to-be-transmitted data subjected to the data repetition operation may be (a1, a1, a2, a2, a3, a3, a4, a4).

In the embodiment of the present application, after the inverse Fourier transform is performed on the to-be-transmitted data in the N groups of data sets, the data repetition operation may be performed on the to-be-transmitted data subjected to the inverse Fourier transform so that the number of pieces of to-be-transmitted data in the N groups of data sets is increased.

On the basis of the preceding embodiment of the present application, the multiplication operation is the dot product operation, that is, the to-be-transmitted data subjected to the data repetition operation is multiplied by the element corresponding to the to-be-multiplied sequence.

On the basis of the preceding embodiment of the present application, the multiplication operation processing includes multiplying the N groups of data sets subjected to the inverse Fourier transform by each element in the to-be-multiplied sequence.

The multiplication operation processing may refer to multiplying one or more pieces of data generated through the inverse Fourier transform by each element in the to-be-multiplied sequence.

On the basis of the preceding embodiment of the present application, the multiplication operation processing includes performing a windowing operation on the N groups of data sets by using a waveform function.

In the embodiment of the present application, the multiplication operation may refer to separately multiplying the to-be-transmitted data in the N groups of data sets by a waveform function in the manner of windowing. To-be-transmitted data in different groups of data sets may use the same or different waveform functions.

On the basis of the preceding embodiment of the present application, before the multiplication operation processing is separately performed on the N groups of data sets, the method further includes performing a filtering operation on the N groups of data sets.

Filtering may be an operation of filtering out characteristic band frequencies in a signal to prevent signal interference.

Before the to-be-transmitted data in the N groups of data sets is processed by using the multiplication operation, the filtering operation may further be performed on the N groups of data sets.

On the basis of the preceding embodiment of the present application, the filtering operation is polyphaser filtering.

The data repetition may be performed on the to-be-transmitted data in the N groups of data sets, then the polyphaser filtering is performed on the to-be-transmitted data subjected to the data repetition, and the dot product operation may be performed after the polyphaser filtering.

On the basis of the preceding embodiment of the present application, transmitting the N groups of data sequences includes the following.

In the case where N is greater than 1, the N groups of data sequences are added as a first data sequence; and the first data sequence is transmitted.

On the basis of the preceding embodiment of the present application, the method further includes performing a filtering operation or a windowing operation on the first data sequence.

On the basis of the preceding embodiment of the present application, numbers of pieces of data included in different data sets are different.

In the embodiment of the present application, numbers of pieces of to-be-transmitted data included in different data sets may be different.

On the basis of the preceding embodiment of the present application, numbers of pieces of data included in different data sets are the same.

Numbers of pieces of to-be-transmitted data included in different data sets may be the same.

On the basis of the preceding embodiment of the present application, the number of inverse Fourier transform points of the inverse Fourier transform is greater than or equal to K(n).

On the basis of the preceding embodiment of the present application, a value of the number of inverse Fourier transform points of the inverse Fourier transform is 2 to the power of i, where i is an integer.

On the basis of the preceding embodiment of the present application, the number of pieces of to-be-transmitted data included in at least one group of data sets does not satisfy 2 to the power of i, oversampling inverse Fourier transform is used so that the number of inverse Fourier transform points is 2 to the power of i, and numbers of inverse Fourier transform points used by the N groups of data sets are the same.

FIG. 4 is a flowchart of a data transmission method according to an embodiment of the present application. The embodiment of the present application is applicable to the case of data transmission, and the method may be executed by a base station or terminal device. The apparatus may be implemented by software and/or hardware. Referring to FIG. 4, the method provided in the embodiment of the present application includes the following.

In 410, to-be-transmitted data is transmitted in N frequency domain resource blocks, where each frequency domain resource block includes K(n) subcarriers, where n=1, 2, . . . , N, a value of N is greater than or equal to 1, and a value of K(n) is greater than or equal to 1.

The to-be-transmitted data is information that can be transmitted in the frequency domain. The to-be-transmitted data may include information data, reference signal data or control data. The frequency domain resource block may be formed by one or more contiguous or non-contiguous subcarriers in the frequency domain.

In the embodiment of the present application, the to-be-transmitted data may be transmitted in the frequency domain resource blocks formed by one or more subcarriers.

In 420, inverse Fourier transform is performed on to-be-transmitted data on the each frequency domain resource block of the N frequency domain resource blocks to form N groups of data sequences.

The inverse Fourier transform may be the processing of converting frequency domain signals into time domain signals, and the multiplication operation may be the processing of performing a dot product operation on the to-be-transmitted data on each frequency-domain resource block of the N frequency domain resource blocks. Each piece of to-be-transmitted data may be separately multiplied by an element in a to-be-multiplied sequence.

The inverse Fourier transform and the dot product operation may be performed on one or more frequency domain resource blocks carrying the to-be-transmitted data so that N groups of generated data sequences are acquired.

In 430, the N groups of data sequences are transmitted, where the number K(n) of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same, where i is an integer, and the number of inverse Fourier transform points is less than or equal to the sum of numbers of subcarriers included in the N frequency domain resource blocks.

One or more generated data sequences may be transmitted. In the embodiment of the present application, the number K(n) of subcarriers included in one or more frequency domain resource blocks of the N frequency domain resource blocks does not satisfy 2 to the power of i, and the oversampling inverse Fourier transform may be performed on the to-be-transmitted data on the one or more frequency domain resource blocks so that the number of inverse Fourier transform points used by the one or more frequency domain resource blocks satisfies 2 to the power of i, numbers of inverse Fourier transform points used by the N frequency domain resource blocks are the same, and the number of inverse Fourier transform points may be less than the sum of the numbers of subcarriers included in the N frequency domain resource blocks.

On the basis of the preceding embodiment of the present application, the number of inverse Fourier transform points is less than or equal to two times the number of subcarriers included in the each frequency domain resource block.

In the embodiment of the present application, the number of inverse Fourier transform points used for the inverse Fourier transform performed on the to-be-transmitted data on each frequency domain resource block is less than or equal to two times the number of subcarriers included in each frequency domain resource block.

In an example embodiment, the to-be-transmitted data is transmitted in the N frequency domain resource blocks, and each frequency domain resource block includes K(n) subcarriers. FIG. 5 is an example diagram of a data transmission method according to an embodiment of the present application. Referring to FIG. 5, numbers of subcarriers included in the N frequency domain resource blocks are the same, and K(n)=12; spectrum bandwidths of the N frequency domain resource blocks are equal, and spectrum spacing of adjacent frequency domain resource blocks is equal; a spectrum bandwidth of each frequency domain resource block is equal to the spectrum spacing of adjacent frequency domain resource blocks, that is, no null subcarrier exists between adjacent frequency domain resource blocks.

The inverse Fourier transform is performed on the to-be-transmitted data on the K(n) subcarriers of each frequency domain resource block so that N groups of time domain data sequences are acquired. In the embodiment, on the data basis of 12 subcarriers, 4 more zeros are padded so that the inverse Fourier transform is 16-point oversampling inverse Fourier transform, that is, the number of inverse fast Fourier transform (IFFT) points is 2 to the power of i.

Then, the repetition operation and the dot product operation are separately performed on the N groups of time domain data sequences. A data sequence used for multiplication includes a sequence of data of which moduli are equal and phases sequentially change by the same θ(n). Moreover, different groups of time domain data sequences have different values of θ(n). For example, the first group (that is, n=1) of time domain data sequence is (a1, a2, . . . , a16), and after R times of repetition (in the embodiment, R=4), the time domain data sequence is (a1, a1, a1, a1, a2, a2, a2, a2, . . . , a16, a16, a16, a16); it is assumed that the data sequence used for multiplication is (exp(j.0), exp(j.0), exp(j.0), exp (j.0)), where the modulus is 1, and θ(1)=0, that is, phases of elements in the data sequence sequentially change by the same value of θ(1) satisfying that θ(1)=0 (each element is equal to 1 here); after the dot product operation, the first group of time domain data sequence is changed to (a1, a1, a1, a1, a2, a2, a2, a2, . . . , a16, a16, a16, a16). For example, the second group (that is, n=2) of time domain data sequence is (b1, b2, . . . , b16), and after R times of repetition (in the embodiment, R=4), the time domain data sequence is (b1, b1, b1, b1, b2, b2, b2, b2, . . . , b16, b16, b16, b16); it is assumed that the data sequence used for multiplication is (exp(j.0), exp(j.pi/2), exp(j.pi), exp(j.3pi/2)), where the modulus is 1, and θ(2)=pi/2, that is, phases of elements in the data sequence sequentially change by the same value of θ(2) satisfying that θ(2)=pi/2; after the dot product operation, the second group of time domain data sequence is changed to (b1.exp(j.0), b1.exp(j.pi/2), b1.exp(j.pi), b1.exp (j.3pi/2), b2.exp(j.0), b2.exp(j.pi/2), b2.exp(j.pi), b2.exp (j.3pi/2), . . . , b16.exp(j.0), b16.exp(j.pi/2), b16.exp(j.pi), b16.exp(j.3pi/2)). It is assumed that in the embodiment, N=2, and then two groups of time domain data sequences are transmitted.

It is to be noted that the preceding data repetition operation and dot product operation may be extension operations; that is, without the repetition operation, the data is multiplied by each element of the data sequence used for multiplication, which can also form the same two groups of time domain data sequences as above.

Transmitting the two groups of time domain data sequences further includes adding the two groups of time domain data sequences to form one group of time domain data sequence: (a1+b1.exp(j.0), a1+b1.exp(j.pi/2), a1+b1.exp(j.pi), a1+b1.exp(j.3pi/2), a2+b2.exp(j.0), a2+b2.exp(j.pi/2), a2+b2.exp(j.pi), a2+b2.exp(j.3pi/2), . . . , a16+b16.exp(j.0), a16+b16.exp(j.pi/2), a16+b16.exp(j.pi), a16+b16.exp(j.3pi/2)), and further includes performing a windowing operation on the one group of time domain data sequence by using a waveform function, where the windowing operation further includes a time domain dislocation superposition operation. For example, if the waveform function is a rectangular function, and if a superposition coefficient of the time domain dislocation superposition operation is 1, the time domain data sequence subjected to the dislocation superposition operation is (a1+b1.exp(j.0), a1+b1.exp (j.pi/2), a1+b1.exp(j.pi), a1+b1.exp(j.3pi/2)+a2+b2.exp(j.0), a2+b2.exp(j.pi/2), a2+b2.exp(j.pi), a2+b2.exp(j.3pi/2)+a3+ b3.exp(j.0), . . . , a15+b15.exp(j.3pi/2)+a16+b16.exp(j.0), a16+b16.exp(j.pi/2), a16+b16.exp(j.pi), a16+b16.exp(j.3pi/ 2)).

Alternatively, transmitting the two groups of time domain data sequences further includes performing a windowing operation on each group of time domain data sequence by using a waveform function, where the windowing operation further includes a time domain dislocation superposition operation. The windowing operation by using the waveform function is also part of the dot product operation. Then the two groups of time domain data sequences are added to form one group of time domain data sequence.

Moreover, it is to be noted that the preceding repetition operation and dot product operation may also be the repetition operation, the polyphaser filtering operation and the dot product operation. In this manner, after the formed two groups of time domain data sequences are added into one group of time domain data sequence, a further windowing operation is not required.

Figure 6:
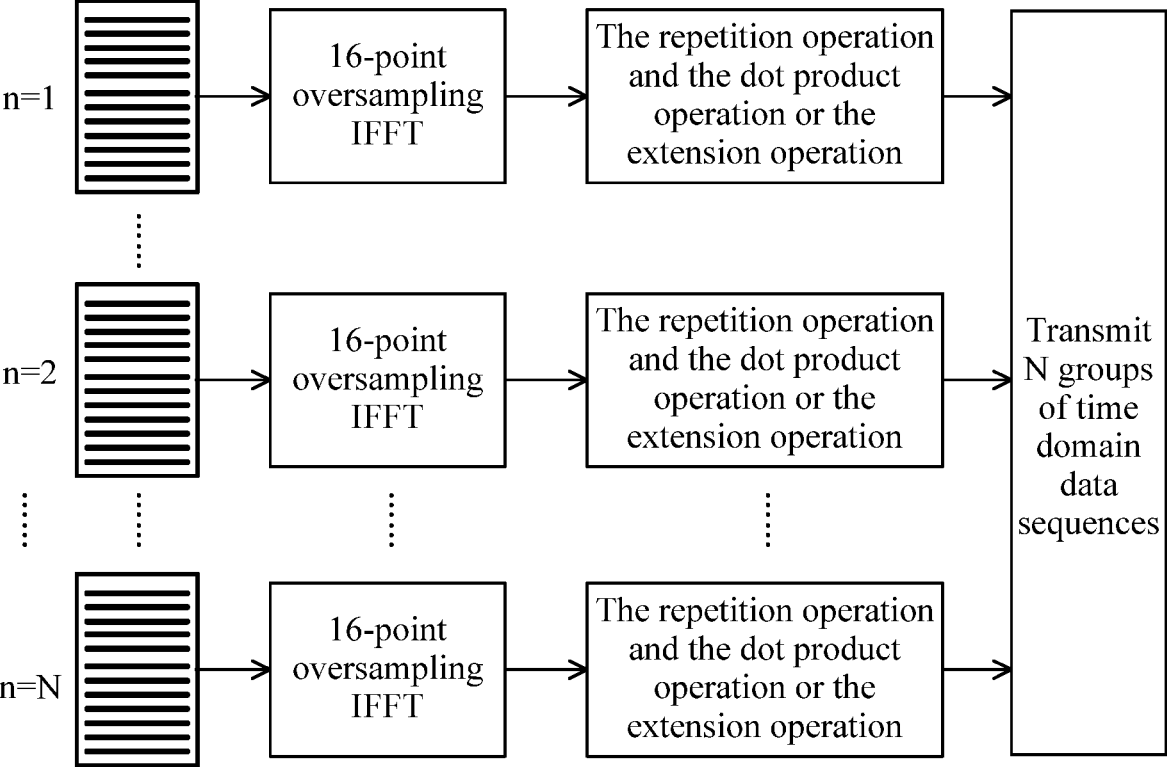
FIG. 6 is an example diagram of a data transmission method according to an embodiment of the present application.

In an example embodiment, the to-be-transmitted data is transmitted in the N frequency domain resource blocks, and each frequency domain resource block includes K(n) subcarriers. FIG. 6 is an example diagram of a data transmission method according to an embodiment of the present application. Referring to FIG. 6, numbers of subcarriers included in the N frequency domain resource blocks are the same, and K(n)=12; spectrum bandwidths of the N frequency domain resource blocks are equal, and spectrum spacing of adjacent frequency domain resource blocks is not equal; as shown in FIG. 6, the spectrum spacing between the first frequency domain resource block and the second frequency domain resource block is greater than the spectrum bandwidth of the frequency domain resource block, that is, a spare spectrum resource or another spectrum resource exists between the first frequency domain resource block and the second frequency domain resource block.

The inverse Fourier transform is performed on the to-be-transmitted data on the K(n) subcarriers of each frequency domain resource block of the N frequency domain resource blocks so that N groups of time domain data sequences are acquired. In the embodiment, on the data basis of 12 subcarriers, 4 more zeros are padded so that the inverse Fourier transform is 16-point oversampling inverse Fourier transform, that is, the number of inverse fast Fourier transform (IFFT) points is 2 to the power of i.

Then, the repetition operation and the dot product operation are separately performed on the N groups of time domain data sequences. A data sequence used for multiplication includes a sequence of data of which moduli are equal and phases sequentially change by the same θ(n). Different groups of time domain data sequences have different values of θ(n). For example, the first group (that is, n=1) of time domain data sequence is (a1, a2, . . . , a16), and after R times of repetition (in the embodiment, R=4), the time domain data sequence is (a1, a1, a1, a1, a2, a2, a2, a2, . . . , a16, a16, a16, a16); it is assumed that the data sequence used for multiplication is (exp(j.0), exp(j.0), exp(j.0), exp(j.0)), where the modulus is 1, and $\theta(1)=0$, that is, phases of elements in the data sequence sequentially change by the same value of $\theta(1)$ satisfying that $\theta(1)=0$ (each element is equal to 1 here); after the dot product operation, the first group of time domain data sequence is changed to (a1, a1, a1, a1, a2, a2, a2, a2, . . . , a16, a16, a16, a16). For example, the second group (that is, n=2) of time domain data sequence is (b1, b2, . . . , b16), and after R times of repetition (in the embodiment, R=4), the time domain data sequence is (b1, b1, b1, b1, b2, b2, b2, b2, . . . , b16, b16, b16, b16); it is assumed that the data sequence used for multiplication is (exp(j.0), exp(j.pi/2), exp(j.pi), exp(j.3pi/2)), where the modulus is 1, and $\theta(2)=pi/2$, that is, phases of elements in the data sequence sequentially change by the same value of $\theta(2)$ satisfying that $\theta(2)=pi/2$; after the dot product operation, the second group of time domain data sequence is changed to (b1.exp(j.0), b1.exp(j.pi/2), b1.exp(j.pi), b1.exp (j.3pi/2), b2.exp(j.0), b2.exp(j.pi/2), b2.exp(j.pi), b2.exp (j.3pi/2), . . . , b16.exp(j.0), b16.exp(j.pi/2), b16.exp(j.pi), b16.exp(j.3pi/2)). It is assumed that in the embodiment, N=2, and then two groups of time domain data sequences are transmitted.

It is to be noted that the preceding data repetition operation and dot product operation may be extension operations; that is, without the repetition operation, the data is multiplied by each element of the data sequence used for multiplication, which can also form the same two groups of time domain data sequences as above.

Transmitting the two groups of time domain data sequences further includes adding the two groups of time domain data sequences to form one group of time domain data sequence: (a1+b1.exp(j.0), a1+b1.exp(j.pi/2), a1+b1.exp(j.pi), a1+b1.exp(j.3pi/2), a2+b2.exp(j.0), a2+b2.exp(j.pi/2), a2+b2.exp(j.pi), a2+b2.exp(j.3pi/2), . . . , a16+b16.exp(j.0), a16+b16.exp(j.pi/2), a16+b16.exp(j.pi), a16+b16.exp(j.3pi/2)), and further includes performing a windowing operation on the one group of time domain data sequence by using a waveform function, where the windowing operation further includes a time domain dislocation superposition operation. For example, if the waveform function is a rectangular function, and if a superposition coefficient of the time domain dislocation superposition operation is 1, the time domain data sequence subjected to the dislocation superposition operation is (a1+b1.exp(j.0), a1+b1.exp (j.pi/2), a1+b1.exp(j.pi), a1+b1.exp(j.3pi/2)+a2+b2.exp(j.0), a2+b2.exp(j.pi/2), a2+b2.exp(j.pi), a2+b2.exp(j.3pi/2)+a3+ b3.exp(j.0), . . . , a15+b15.exp(j.3pi/2)+a16+b16.exp(j.0), a16+b16.exp(j.pi/2), a16+b16.exp(j.pi), a16+b16.exp(j.3pi/ 2)).

Alternatively, transmitting the two groups of time domain data sequences further includes performing a windowing operation on each group of time domain data sequence by using a waveform function, where the windowing operation further includes a time domain dislocation superposition operation. The windowing operation by using the waveform function is also part of the dot product operation. Then the two groups of time domain data sequences are added to form one group of time domain data sequence.

Moreover, it is to be noted that the preceding repetition operation and dot product operation may also be the repetition operation, the polyphaser filtering operation and the dot product operation. In this manner, after the formed two groups of time domain data sequences are added into one group of time domain data sequence, a further windowing operation is not required.

Figure 7:
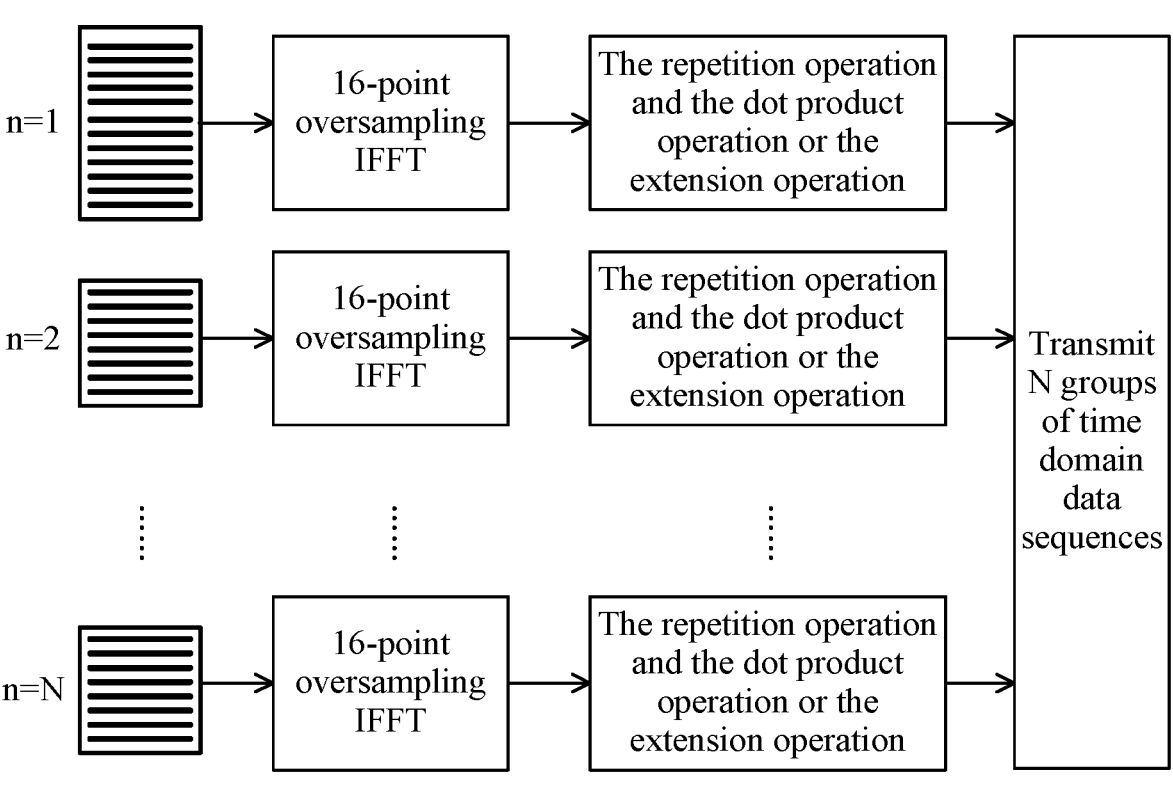
FIG. 7 is an example diagram of another data transmission method according to an embodiment of the present application.

In an example embodiment, the to-be-transmitted data is transmitted in the N frequency domain resource blocks, and each frequency domain resource block includes K(n) subcarriers. FIG. 7 is an example diagram of another data transmission method according to an embodiment of the present application. Referring to FIG. 7, numbers of subcarriers included in the N frequency domain resource blocks are not equal, K(1)=12, and K(n)=8; spectrum bandwidths of the N frequency domain resource blocks are not equal, and spectrum spacing of adjacent frequency domain resource blocks is not equal.

The inverse Fourier transform is performed on the to-be-transmitted data on the K(n) subcarriers of each frequency domain resource block of the N frequency domain resource blocks so that N groups of time domain data sequences are acquired. In the embodiment of the present application, different numbers of zeros are padded so that the inverse Fourier transform of each frequency domain resource block is the 16-point oversampling inverse Fourier transform (that is, the number of IFFT points is 2 to the power of i). In other words, on the basis of the frequency resource block with the maximum number of subcarriers, the number of IFFT points reaches 2 to the power of i by zero padding. In other words, the number of IFFT points is at least greater than 12.

Then, the repetition operation and the dot product operation are separately performed on the N groups of time domain data sequences. A data sequence used for multiplication includes a sequence of data of which moduli are equal and phases sequentially change by the same $\theta(n)$. Different groups of time domain data sequences have different values of $\theta(n)$. For example, the first group (that is, n=1) of time domain data sequence is (a1, a2, . . . , a16), and after R times of repetition (in the embodiment, R=4), the time domain data sequence is (a1, a1, a1, a1, a2, a2, a2, a2, . . . , a16, a16, a16, a16); it is assumed that the data sequence used for multiplication is (exp(j.0), exp(j.0), exp(j.0), exp(j.0)), where the modulus is 1, and $\theta(1)=0$, that is, phases of elements in the data sequence sequentially change by the same value of $\theta(1)$ satisfying that $\theta(1)=0$ (each element is equal to 1 here); after the dot product operation, the first group of time domain data sequence is changed to (a1, a1, a1, a1, a2, a2, a2, a2, . . . , a16, a16, a16, a16). For example, the second group (that is, n=2) of time domain data sequence is (b1, b2, . . . , b16), and after R times of repetition (in the embodiment, R=4), the time domain data sequence is (b1, b1, b1, b1, b2, b2, b2, b2, . . . , b16, b16, b16, b16); it is assumed that the data sequence used for multiplication is (exp(j.0), exp(j.pi/2), exp(j.pi), exp(j.3pi/2)), where the modulus is 1, and $\theta(2)=pi/2$, that is, phases of elements in the data sequence sequentially change by the same value of $\theta(2)$ satisfying that $\theta(2)=pi/2$; after the dot product operation, the second group of time domain data sequence is changed to (b1.exp(j.0), b1.exp(j.pi/2), b1.exp(j.pi), b1.exp (j.3pi/2), b2.exp(j.0), b2.exp(j.pi/2), b2.exp(j.pi), b2.exp (j.3pi/2), . . . , b16.exp(j.0), b16.exp(j.pi/2), b16.exp(j.pi), b16.exp(j.3pi/2)). It is assumed that in the embodiment, N=2, and then two groups of time domain data sequences are transmitted.

It is to be noted that the preceding data repetition operation and dot product operation may be extension operations; that is, without the repetition operation, the data is multiplied by each element of the data sequence used for multiplication, which can also form the same two groups of time domain data sequences as above.

Transmitting the two groups of time domain data sequences further includes adding the two groups of time domain data sequences to form one group of time domain data sequence: (a1+b1.exp(j.0), a1+b1.exp(j.pi/2), a1+b1.exp(j.pi), a1+b1.exp(j.3pi/2), a2+b2.exp(j.0), a2+b2.exp(j.pi/2), a2+b2.exp(j.pi), a2+b2.exp(j.3pi/2), . . . , a16+b16.exp(j.0), a16+b16.exp(j.pi/2), a16+b16.exp(j.pi), a16+b16.exp(j.3pi/2)), and further includes performing a windowing operation on the one group of time domain data sequence by using a waveform function, where the windowing operation further includes a time domain dislocation superposition operation. For example, if the waveform function is a rectangular function, and if a superposition coefficient of the time domain dislocation superposition operation is 1, the time domain data sequence subjected to the dislocation superposition operation is (a1+b1.exp(j.0), a1+b1.exp (j.pi/2), a1+b1.exp(j.pi), a1+b1.exp(j.3pi/2)+a2+b2.exp(j.0), a2+b2.exp(j.pi/2), a2+b2.exp(j.pi), a2+b2.exp(j.3pi/2)+a3+ b3.exp(j.0), . . . , a15+b15.exp(j.3pi/2)+a16+b16.exp(j.0), a16+b16.exp(j.pi/2), a16+b16.exp(j.pi), a16+b16.exp(j.3pi/ 2)).

Alternatively, transmitting the two groups of time domain data sequences further includes performing a windowing operation on each group of time domain data sequence by using a waveform function, where the windowing operation further includes a time domain dislocation superposition operation. The windowing operation by using the waveform function is also part of the dot product operation. Then the two groups of time domain data sequences are added to form one group of time domain data sequence.

Moreover, it is to be noted that the preceding repetition operation and dot product operation may also be the repetition operation, the polyphaser filtering operation and the dot product operation. In this manner, after the formed two groups of time domain data sequences are added into one group of time domain data sequence, a further windowing operation is not required.

Figure 8:
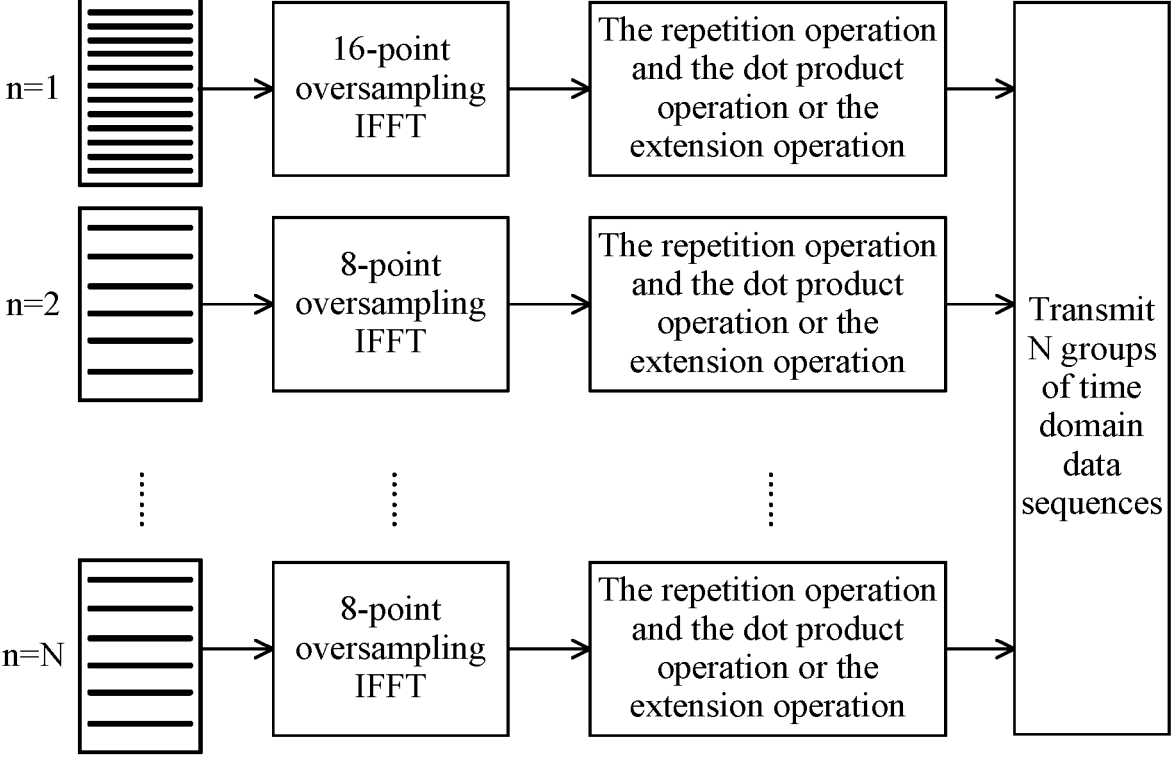
FIG. 8 is an example diagram of another data transmission method according to an embodiment of the present application.

In an example embodiment, the to-be-transmitted data is transmitted in the N frequency domain resource blocks, and each frequency domain resource block includes K(n) subcarriers. FIG. 8 is an example diagram of another data transmission method according to an embodiment of the present application. Referring to FIG. 8, spectrum bandwidths of the N frequency domain resource blocks are equal, but the subcarrier spacing of the N frequency domain resource blocks is different. The subcarrier spacing of the first frequency domain resource block is small, while the subcarrier spacing of the remaining frequency domain resource blocks is twice the subcarrier spacing of the first frequency domain resource block; the number of subcarriers K(1) satisfies that K(1)=12, and the number of subcarriers of the remaining frequency domain resource blocks K(n) satisfies that K(n)=6.

The inverse Fourier transform is performed on the to-be-transmitted data on the K(n) subcarriers of each frequency domain resource block of the N frequency domain resource blocks so that N groups of time domain data sequences are acquired. In the embodiment of the present application, the to-be-transmitted data is padded with different numbers of zeros so that the number of IFFT points of the inverse Fourier transform of each frequency domain resource block is 2 to the power of i. The ratio of the length of each time domain data sequence after the IFFT corresponding to the first resource block to the length of each time domain data sequence after the IFFT corresponding to another frequency domain resource block satisfies 2 to the power of i (that is, $2^i$). In the embodiment, i=1. Therefore, for another frequency domain resource block, two time domain data sequences need to be connected in series so that the time domain length of the two time domain data sequences of another resource block is equal to the time domain length of one time domain data sequence of the first frequency domain resource block.

Then, the repetition operation and the dot product operation are separately performed on the N groups of time domain data sequences. A data sequence used for multiplication includes a sequence of data of which moduli are equal and phases sequentially change by the same θ(n). Different groups of time domain data sequences have different values of θ(n). For example, the first group (that is, n=1) of time domain data sequence is (a1, a2, . . . , a16), and after R times of repetition (in the embodiment, R=4), the time domain data sequence is (a1, a1, a1, a1, a2, a2, a2, a2, . . . , a16, a16, a16, a16); it is assumed that the data sequence used for multiplication is (exp(j.0), exp(j.0), exp(j.0), exp(j.0)), where the modulus is 1, and θ(1)=0, that is, phases of elements in the data sequence sequentially change by the same value of θ(1) satisfying that θ(1)=0 (each element is equal to 1 here); after the dot product operation, the first group of time domain data sequence is changed to (a1, a1, a1, a1, a2, a2, a2, a2, . . . , a16, a16, a16, a16). For example, the second group (that is, n=2) of time domain data sequence is (b1, b2, . . . , b16), and after R times of repetition (in the embodiment, R=4), the time domain data sequence is (b1, b1, b1, b1, b2, b2, b2, b2, . . . , b16, b16, b16, b16); it is assumed that the data sequence used for multiplication is (exp(j.0), exp(j.pi/2), exp(j.pi), exp(j.3pi/2)), where the modulus is 1, and θ(2)=pi/2, that is, phases of elements in the data sequence sequentially change by the same value of θ(2) satisfying that θ(2)=pi/2; after the dot product operation, the second group of time domain data sequence is changed to (b1.exp(j.0), b1.exp(j.pi/2), b1.exp(j.pi), b1.exp (j.3pi/2), b2.exp(j.0), b2.exp(j.pi/2), b2.exp(j.pi), b2.exp (j.3pi/2), . . . , b16.exp(j.0), b16.exp(j.pi/2), b16.exp(j.pi), b16.exp(j.3pi/2)). It is assumed that in the embodiment, N=2, and then two groups of time domain data sequences are transmitted.

It is to be noted that the preceding data repetition operation and dot product operation may be extension operations; that is, without the repetition operation, the data is multiplied by each element of the data sequence used for multiplication, which can also form the same two groups of time domain data sequences as above.

Transmitting the two groups of time domain data sequences further includes adding the two groups of time domain data sequences to form one group of time domain data sequence: (a1+b1.exp(j.0), a1+b1.exp(j.pi/2), a1+b1.exp(j.pi), a1+b1.exp(j.3pi/2), a2+b2.exp(j.0), a2+b2.exp(j.pi/2), a2+b2.exp(j.pi), a2+b2.exp(j.3pi/2), . . . , a16+b16.exp(j.0), a16+b16.exp(j.pi/2), a16+b16.exp(j.pi), a16+b16.exp(j.3pi/2)), and further includes performing a windowing operation on the one group of time domain data sequence by using a waveform function, where the windowing operation further includes a time domain dislocation superposition operation. For example, if the waveform function is a rectangular function, and if a superposition coefficient of the time domain dislocation superposition operation is 1, the time domain data sequence subjected to the dislocation superposition operation is (a1+b1.exp(j.0), a1+b1.exp (j.pi/2), a1+b1.exp(j.pi), a1+b1.exp(j.3pi/2)+a2+b2.exp(j.0), a2+b2.exp(j.pi/2), a2+b2.exp(j.pi), a2+b2.exp(j.3pi/2)+a3+ b3.exp(j.0), . . . , a15+b15.exp(j.3pi/2)+a16+b16.exp(j.0), a16+b16.exp(j.pi/2), a16+b16.exp(j.pi), a16+b16.exp(j.3pi/ 2)).

Alternatively, transmitting the two groups of time domain data sequences further includes performing a windowing operation on each group of time domain data sequence by using a waveform function, where the windowing operation further includes a time domain dislocation superposition operation. The windowing operation by using the waveform function is also part of the dot product operation. Then the two groups of time domain data sequences are added to form one group of time domain data sequence.

Moreover, it is to be noted that the preceding repetition operation and dot product operation may also be the repetition operation, the polyphaser filtering operation and the dot product operation. In this manner, after the formed two groups of time domain data sequences are added into one group of time domain data sequence, a further windowing operation is not required.

Figure 9:
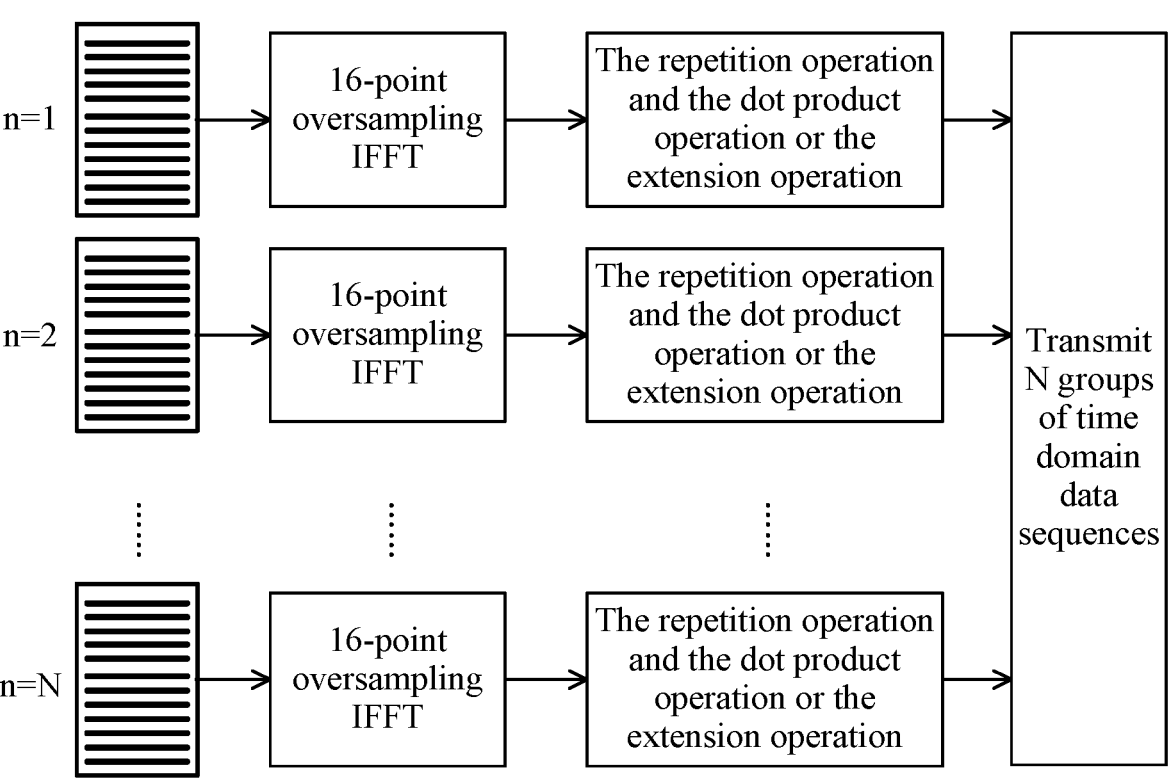
FIG. 9 is an example diagram of a data modulation method according to an embodiment of the present application.

In an example embodiment, the to-be-transmitted data sequence is divided into N groups, and each group of to-be-transmitted data sequence includes $K(n)$ pieces of data. FIG. 9 is an example diagram of a data modulation method according to an embodiment of the present application. Referring to FIG. 9, each group of to-be-transmitted data sequence includes the same number of pieces of data, and $K(n)=12$.

The inverse Fourier transform is performed on each group of data sequence of the N groups of to-be-transmitted data sequences so that N groups of data sequences are acquired. In the embodiment, on the basis that each group of data sequence includes 12 pieces of data, 4 more zeros are padded so that the inverse Fourier transform is the 16-point oversampling inverse Fourier transform (that is, the number of IFFT points is 2 to the power of i).

Then, the repetition operation and the dot product operation are separately performed on the N groups of time domain data sequences. A data sequence used for multiplication includes a sequence of data of which moduli are equal and phases sequentially change by the same $\theta(n)$. Different groups of time domain data sequences have different values of $\theta(n)$. For example, the first group (that is, $n=1$) of time domain data sequence is $(a1, a2, \ldots, a16)$, and after R times of repetition (in the embodiment, $R=4$), the time domain data sequence is $(a1, a1, a1, a1, a2, a2, a2, a2, \ldots, a16, a16, a16, a16)$; it is assumed that the data sequence used for multiplication is $(\exp(j.0), \exp(j.0), \exp(j.0), \exp(j.0))$, where the modulus is 1, and $\theta(1)=0$, that is, phases of elements in the data sequence sequentially change by the same value of $\theta(1)$ satisfying that $\theta(1)=0$ (each element is equal to 1 here); after the dot product operation, the first group of time domain data sequence is changed to $(a1, a1, a1, a1, a2, a2, a2, a2, \ldots, a16, a16, a16, a16)$. For example, the second group (that is, $n=2$) of time domain data sequence is $(b1, b2, \ldots, b16)$, and after R times of repetition (in the embodiment, $R=4$), the time domain data sequence is $(b1, b1, b1, b1, b2, b2, b2, b2, \ldots, b16, b16, b16, b16)$; it is assumed that the data sequence used for multiplication is $(\exp(j.0), \exp(j.pi/2), \exp(j.pi), \exp(j.3pi/2))$, where the modulus is 1, and $\theta(2)=pi/2$, that is, phases of elements in the data sequence sequentially change by the same value of $\theta(2)$ satisfying that $\theta(2)=pi/2$; after the dot product operation, the second group of time domain data sequence is changed to $(b1.\exp(j.0), b1.\exp(j.pi/2), b1.\exp(j.pi), b1.\exp(j.3pi/2), b2.\exp(j.0), b2.\exp(j.pi/2), b2.\exp(j.pi), b2.\exp(j.3pi/2), \ldots, b16.\exp(j.0), b16.\exp(j.pi/2), b16.\exp(j.pi), b16.\exp(j.3pi/2))$. It is assumed that in the embodiment, $N=2$, and then two groups of time domain data sequences are transmitted.

It is to be noted that the preceding data repetition operation and dot product operation may be extension operations; that is, without the repetition operation, the data is multiplied by each element of the data sequence used for multiplication, which can also form the same two groups of time domain data sequences as above.

Transmitting the two groups of time domain data sequences further includes adding the two groups of time domain data sequences to form one group of time domain data sequence: $(a1+b1.\exp(j.0), a1+b1.\exp(j.pi/2), a1+b1.\exp(j.pi), a1+b1.\exp(j.3pi/2), a2+b2.\exp(j.0), a2+b2.\exp(j.pi/2), a2+b2.\exp(j.pi), a2+b2.\exp(j.3pi/2), \ldots, a16+b16.\exp(j.0), a16+b16.\exp(j.pi/2), a16+b16.\exp(j.pi), a16+b16.\exp(j.3pi/2))$, and further includes performing a windowing operation on the one group of time domain data sequence by using a waveform function, where the windowing operation further includes a time domain dislocation superposition operation. For example, if the waveform function is a rectangular function, and if a superposition coefficient of the time domain dislocation superposition operation is 1, the time domain data sequence subjected to the dislocation superposition operation is $(a1+b1.\exp(j.0), a1+b1.\exp(j.pi/2), a1+b1.\exp(j.pi), a1+b1.\exp(j.3pi/2)+a2+b2.\exp(j.0), a2+b2.\exp(j.pi/2), a2+b2.\exp(j.pi), a2+b2.\exp(j.3pi/2)+a3+b3.\exp(j.0), \ldots, a15+b15.\exp(j.3pi/2)+a16+b16.\exp(j.0), a16+b16.\exp(j.pi/2), a16+b16.\exp(j.pi), a16+b16.\exp(j.3pi/2))$.

Alternatively, transmitting the two groups of time domain data sequences further includes performing a windowing operation on each group of time domain data sequence by using a waveform function, where the windowing operation further includes a time domain dislocation superposition operation. The windowing operation by using the waveform function is also part of the dot product operation. Then the two groups of time domain data sequences are added to form one group of time domain data sequence.

Moreover, it is to be noted that the preceding repetition operation and dot product operation may also be the repetition operation, the polyphaser filtering operation and the dot product operation. In this manner, after the formed two groups of time domain data sequences are added into one group of time domain data sequence, a further windowing operation is not required.

Figure 10:
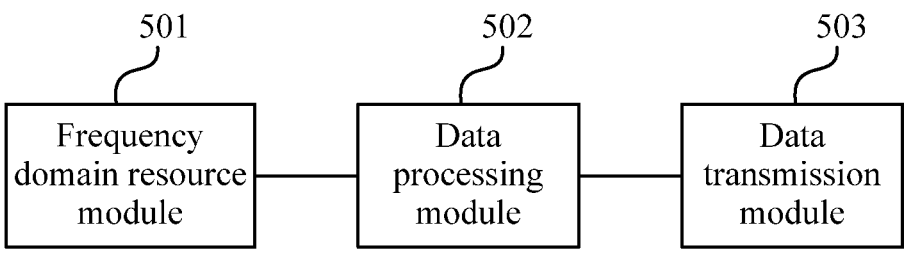
FIG. 10 is a structural diagram of a data transmission apparatus according to an embodiment of the present application.

FIG. 10 is a structural diagram of a data transmission apparatus according to an embodiment of the present application. The data transmission apparatus may perform the data transmission method according to any embodiment of the present application and has the corresponding function modules of the performed method. The apparatus may be implemented by software and/or hardware. The apparatus includes a frequency domain resource module 501, a data processing module 502 and a data transmission module 503. The frequency domain resource module 501 is configured to transmit to-be-transmitted data in N frequency domain resource blocks, where each frequency domain resource block includes $K(n)$ subcarriers, where $n=1, 2, \ldots, N$, a value of N is greater than or equal to 1, and a value of $K(n)$ is greater than or equal to 1. The data processing module 502 is configured to perform inverse Fourier transform and multiplication operation processing on to-be-transmitted data on the each frequency domain resource block of the N frequency domain resource blocks to form N groups of data sequences. The data transmission module 503 is configured to transmit the N groups of data sequences.

In the embodiment of the present application, the frequency resource module transmits the to-be-transmitted data in the N frequency domain resource blocks, where each frequency domain resource block includes K(n) subcarriers; the data processing module performs the inverse Fourier transform and a dot product operation processing on to-be-transmitted data on the each frequency domain resource block of the N frequency domain resource blocks to form the N groups of data sequences; and the data transmission module transmits the N groups of data sequences. In this manner, the common use of multiple frequency domain resource blocks is achieved, so that the utilization of frequency domain resources can be improved.

On the basis of the preceding embodiment of the present application, in the apparatus, the to-be-multiplied sequence used in the multiplication operation processing includes a sequence of values of which moduli are equal and phases sequentially change by the same θ(n), where different frequency domain resource blocks correspond to different values of θ(n).

On the basis of the preceding embodiment of the present application, the apparatus further includes a data repetition unit. The data repetition unit is configured to perform a data repetition operation on the to-be-transmitted data subjected to the inverse Fourier transform.

On the basis of the preceding embodiment of the present application, in the apparatus, the multiplication operation processing includes multiplying the to-be-transmitted data subjected to the inverse Fourier transform by each element in a to-be-multiplied sequence.

On the basis of the preceding embodiment of the present application, in the apparatus, the multiplication operation processing includes performing a windowing operation on the to-be-transmitted data by using a waveform function.

On the basis of the preceding embodiment of the present application, the apparatus further includes a filtering unit. The filtering unit is configured to perform a filtering operation on the to-be-transmitted data.

On the basis of the preceding embodiment of the present application, the filtering operation includes polyphaser filtering.

On the basis of the preceding embodiment of the present application, in the apparatus, in the case where the filtering operation is the polyphaser filtering, the number R of repetitions of the data repetition operation is 2 to the power of i, where i is an integer greater than or equal to 0.

On the basis of the preceding embodiment of the present application, the data transmission module 503 is configured to, in the case where N is greater than 1, add the N groups of data sequences as a first data sequence and transmit the first data sequence.

On the basis of the preceding embodiment of the present application, the apparatus is further configured to perform a filtering operation or a windowing operation on the first data sequence.

On the basis of the preceding embodiment of the present application, the ratio between subcarrier spacing of any two frequency domain resource blocks satisfies 2 to the power of i, where i is an integer.

On the basis of the preceding embodiment of the present application, in the apparatus, the ratio between spectrum bandwidths of any two frequency domain resource blocks satisfies 2 to the power of i, where i is an integer.

On the basis of the preceding embodiment of the present application, in the apparatus, the ratio between numbers of subcarriers of any two frequency domain resource blocks satisfies 2 to the power of i, where i is an integer.

On the basis of the preceding embodiment of the present application, in the apparatus, the number of inverse Fourier transform points of the inverse Fourier transform is greater than or equal to K(n).

On the basis of the preceding embodiment of the present application, in the apparatus, the number of inverse Fourier transform points of the inverse Fourier transform is 2 to the power of i, where i is an integer.

On the basis of the preceding embodiment of the present application, in the apparatus, the number K(n) of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same.

On the basis of the preceding embodiment of the present application, the data processing module 502 in the apparatus is configured to, in the case where subcarrier spacing of the N frequency domain resource blocks is equal, but numbers of subcarriers included in the N frequency domain resource blocks are different, oversampling inverse Fourier transform is used so that the number of inverse Fourier transform points is 2 to the power of i, and numbers of inverse Fourier transform points used by the N frequency domain resource blocks are the same.

On the basis of the preceding embodiment of the present application, in the apparatus, the number of inverse Fourier transform points of the inverse Fourier transform is less than or equal to the sum of numbers of subcarriers included in the N frequency domain resource blocks.

On the basis of the preceding embodiment of the present application, in the apparatus, the number of inverse Fourier transform points of the inverse Fourier transform is less than or equal to two times the number of subcarriers included in the each frequency domain resource block.

Figure 11:
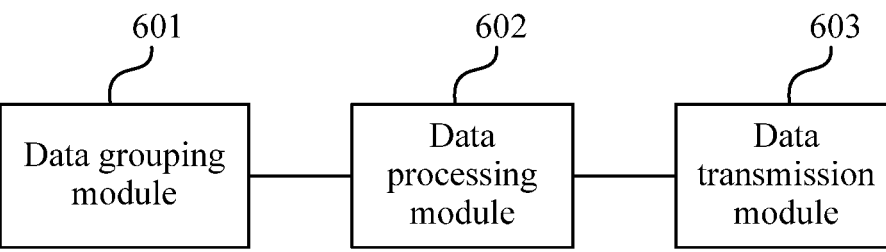
FIG. 11 is a structural diagram of a data modulation apparatus according to an embodiment of the present application.

FIG. 11 is a structural diagram of a data modulation apparatus according to an embodiment of the present application. The data modulation apparatus may perform the data modulation method according to any embodiment of the present application and has the corresponding function modules of the performed method. The apparatus may be implemented by software and/or hardware. The apparatus includes a data grouping module 601, a data processing module 602 and a data transmission module 603. The data grouping module 601 is configured to divide to-be-transmitted data into N groups of data sets, where each group of data sets includes K(n) pieces of to-be-transmitted data, where n=1, 2, . . . , N, a value of N is greater than or equal to 1, and a value of K(n) is greater than or equal to 1. The data processing module 602 is configured to separately perform inverse Fourier transform and multiplication operation processing on the N groups of data sets to form N groups of data sequences. The data transmission module 603 is configured to transmit the N groups of data sequences.

On the basis of the preceding embodiment of the present application, in the apparatus, a to-be-multiplied sequence used in the multiplication operation includes a sequence of values of which moduli are equal and phases sequentially change by the same θ(n), where different data sets correspond to different values of θ(n).

On the basis of the preceding embodiment of the present application, the apparatus further includes a data repetition unit. The data repetition unit is configured to perform a data repetition operation on the data sets subjected to the inverse Fourier transform.

On the basis of the preceding embodiment of the present application, in the apparatus, the multiplication operation processing is a dot product operation, that is, the data sets subjected to the data repetition operation is multiplied by an element corresponding to the to-be-multiplied sequence.

On the basis of the preceding embodiment of the present application, in the apparatus, the multiplication operation processing includes multiplying the data sets subjected to the inverse Fourier transform by each element in a to-be-multiplied sequence.

On the basis of the preceding embodiment of the present application, in the apparatus, the multiplication operation processing includes performing a windowing operation on the N groups of data sets by using a waveform function.

On the basis of the preceding embodiment of the present application, the apparatus further includes a filtering unit. The filtering unit is configured to perform a filtering operation on the N groups of data sets.

On the basis of the preceding embodiment of the present application, in the apparatus, the filtering operation is poly-phaser filtering.

On the basis of the preceding embodiment of the present application, in the apparatus, the data transmission module 603 is configured to, in the case where N is greater than 1, add the N groups of data sequences as a first data sequence and transmit the first data sequence.

On the basis of the preceding embodiment of the present application, the apparatus is further configured to perform a filtering operation or a windowing operation on the first data sequence.

On the basis of the preceding embodiment of the present application, in the apparatus, numbers of pieces of data included in the N groups of data sets are different.

On the basis of the preceding embodiment of the present application, in the apparatus, numbers of pieces of data included in the N groups of data sets are the same.

On the basis of the preceding embodiment of the present application, in the apparatus, the number of inverse Fourier transform points of the inverse Fourier transform is greater than or equal to $K(n)$.

On the basis of the preceding embodiment of the present application, in the apparatus, a value of the number of inverse Fourier transform points of the inverse Fourier transform is 2 to the power of i, where i is an integer.

On the basis of the preceding embodiment of the present application, in the apparatus, the number of pieces of to-be-transmitted data included in at least one group of data sets does not satisfy 2 to the power of i, oversampling inverse Fourier transform is used so that the number of inverse Fourier transform points is 2 to the power of i, and numbers of inverse Fourier transform points used by the N groups of data sets are the same.

Figure 12:
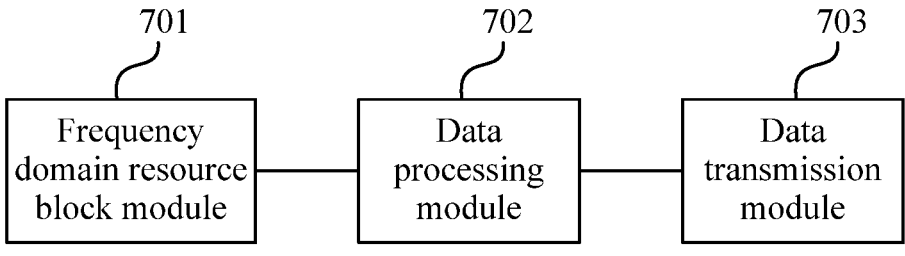
FIG. 12 is a structural diagram of another data transmission apparatus according to an embodiment of the present application.

FIG. 12 is a structural diagram of another data transmission apparatus according to an embodiment of the present application. The data transmission apparatus may perform the data transmission method according to any embodiment of the present application and has the corresponding function modules of the performed method. The apparatus may be implemented by software and/or hardware. The apparatus includes a frequency domain resource block module 701, a data processing module 702 and a data transmission module 703. The frequency domain resource block module 701 is configured to transmit to-be-transmitted data in N frequency domain resource blocks, where each frequency domain resource block includes $K(n)$ subcarriers, where $n=1, 2, \ldots, N$, a value of N is greater than or equal to 1, and a value of $K(n)$ is greater than or equal to 1. The data processing module 702 is configured to perform inverse Fourier transform on to-be-transmitted data on the each frequency domain resource block of the N frequency domain resource blocks to form N groups of data sequences. The data transmission module 703 is configured to transmit the N groups of data sequences. The number $K(n)$ of subcarriers on at least one frequency domain resource block does not satisfy 2 to the power of i, oversampling inverse Fourier transform is used so that the number of inverse Fourier transform points is 2 to the power of i, and numbers of inverse Fourier transform points used by the N frequency domain resource blocks are the same, where i is an integer, and the number of inverse Fourier transform points is less than or equal to the sum of numbers of subcarriers included in the N frequency domain resource blocks.

On the basis of the preceding embodiment of the present application, the number of inverse Fourier transform points of the inverse Fourier transform is less than or equal to two times the number of subcarriers included in each frequency domain resource block.

Figure 13:
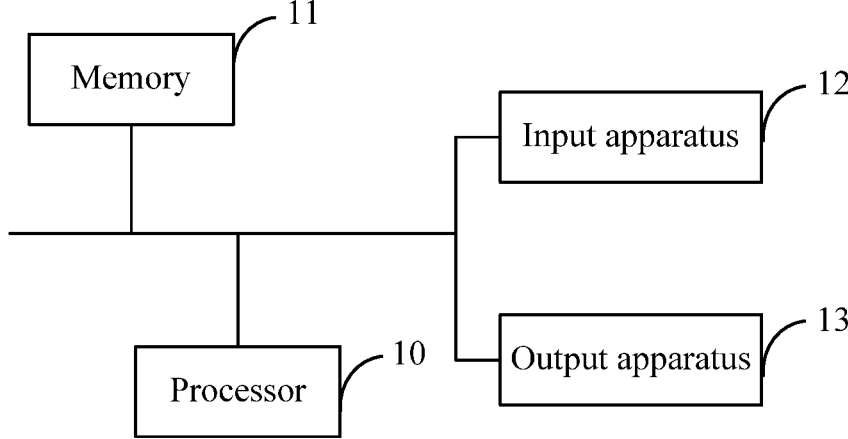
FIG. 13 is a structural diagram of an electronic device according to an embodiment of the present application.

FIG. 13 is a structural diagram of an electronic device according to an embodiment of the present application. The electronic device includes a processor 10, a memory 11, an input apparatus 12 and an output apparatus 13. One or more processors 10 may be included in the electronic device. One processor 10 is shown as an example in FIG. 13. The processor 10, the memory 11, the input apparatus 12 and the output apparatus 13 in the electronic device may be connected via a bus or in other manners. The connection via a bus is shown as an example in FIG. 13.

As a computer-readable storage medium, the memory 11 may be configured to store software programs and computer-executable programs and modules, such as modules (the frequency domain resource module 501, the data processing module 502 and the data transmission module 503; or the data grouping module 601, the data processing module 602 and the data transmission module 603; or the frequency domain resource block module 701, the data processing module 702 and the data transmission module 703) corresponding to the apparatus in the embodiment of the present application. The processor 10 executes software programs, instructions and modules stored in the memory 11 to perform multiple function applications and data processing of the electronic device, that is, to perform the preceding method.

The memory 11 may mainly include a program storage region and a data storage region, where the program storage region may store an operating system and an application program required by at least one function, and the data storage region may store data created according to use of the electronic device. In addition, the memory 11 may include a high-speed random-access memory and may further include a non-volatile memory, such as at least one disk memory, a flash memory or another non-volatile solid-state memory. In some examples, the memory 11 may further include memories that are remotely disposed relative to the processor 10 and these remote memories may be connected to the electronic device via a network. Examples of the preceding network include, but are not limited to, the Internet, an intranet, a local area network, a mobile communication network and a combination thereof.

The input apparatus 12 may be configured to receive inputted digital or character information and generate key signal input related to user settings and function control of the electronic device. The output apparatus 13 may include display devices such as a display screen.

An embodiment of the present application further provides a storage medium including computer-executable instructions which, when executed by a computer processor, are configured to perform a data transmission method. The data transmission method includes: transmitting to-be-transmitted data in N frequency domain resource blocks, where each frequency domain resource block includes K(n) subcarriers, where n=1, 2, . . . , N, a value of N is greater than or equal to 1, and a value of K(n) is greater than or equal to 1; performing inverse Fourier transform and multiplication operation processing on to-be-transmitted data on the each frequency domain resource block of the N frequency domain resource blocks to form N groups of data sequences; and transmitting the N groups of data sequences.

Alternatively, when executed by a computer processor, the computer-executable instructions are configured to perform a data modulation method. The data modulation method includes: dividing to-be-transmitted data into N groups of data sets, where each group of data sets includes K(n) pieces of to-be-transmitted data, where n=1, 2, . . . , N, a value of N is greater than or equal to 1, and a value of K(n) is greater than or equal to 1; separately performing inverse Fourier transform and multiplication operation processing on the N groups of data sets to form N groups of data sequences; and transmitting the N groups of data sequences.

Alternatively, when executed by a computer processor, the computer-executable instructions are configured to perform a data transmission method. The data transmission method includes: transmitting to-be-transmitted data in N frequency domain resource blocks, where each frequency domain resource block includes K(n) subcarriers, where n=1, 2, . . . , N, a value of N is greater than or equal to 1, and a value of K(n) is greater than or equal to 1; performing inverse Fourier transform and multiplication operation processing on to-be-transmitted data on the each frequency domain resource block of the N frequency domain resource blocks to form N groups of data sequences; and transmitting the N groups of data sequences.

The number K(n) of subcarriers on at least one frequency domain resource block does not satisfy 2 to the power of i, oversampling inverse Fourier transform is used so that a number of inverse Fourier transform points is 2 to the power of i, and numbers of inverse Fourier transform points used by the N frequency domain resource blocks are the same, where i is an integer, and the number of inverse Fourier transform points is less than or equal to the sum of numbers of subcarriers included in the N frequency domain resource blocks.

From the preceding description of embodiments, it is apparent to those skilled in the art that the present application may be implemented by use of software and necessary general-purpose hardware or may be implemented by hardware. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk or an optical disc of a computer and includes several instructions for causing a computer device (which may be a personal computer, a server or a network device) to perform the method in the embodiments of the present application.

It is to be noted that units and modules included in the embodiment of the apparatus are just divided according to functional logic, and the division is not limited to this as long as the corresponding functions can be implemented. Additionally, the names of function units are just intended for distinguishing and are not intended to limit the scope of the present application.

It is to be understood by those having ordinary skill in the art that some or all steps of the preceding method and function modules/units in the preceding system or device may be implemented as software, firmware, hardware and a suitable combination thereof.

In the hardware implementation, the division of the function modules/units in the preceding description may not correspond to the division of physical components. For example, one physical component may have multiple functions, or one function or step may be performed cooperatively by multiple physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As known to those having ordinary skill in the art, the term, the computer storage media, includes volatile and non-volatile as well as removable and non-removable media implemented in any method or technology for storing information (such as computer-readable instructions, data structures, program modules, or other data). The computer storage media include, but are not limited to, a RAM, a ROM, an electrically erasable programmable read-only memory (EEPROM), a flash memory, or other memory technologies, a compact disc read-only memory (CD-ROM), a digital video disk (DVD) or other optical disc memories, magnetic cassettes, magnetic tapes, magnetic disk memories or other magnetic storage apparatuses, or any other medium used for storing the desired information and accessible by a computer. Moreover, as known to those having ordinary skill in the art, the communication media generally include computer-readable instructions, data structures, program modules, or other data in carriers or in modulated data signals transported in other transport mechanisms and may include any information delivery medium.

What is claimed is:

1. A data transmission method, comprising:
transmitting to-be-transmitted data in N frequency domain resource blocks, wherein each frequency domain resource block of the N frequency domain resource blocks comprises K(n) subcarriers, wherein n=1, 2, . . . , N, a value of N is greater than or equal to 1, and a value of K(n) is greater than or equal to 1;
performing inverse Fourier transform and multiplication operation processing on to-be-transmitted data on the each frequency domain resource block of the N frequency domain resource blocks to form N groups of data sequences; and
transmitting the N groups of data sequences;
wherein a to-be-multiplied sequence used in the multiplication operation processing comprises: a sequence of values of which moduli are equal and phases sequentially change by a same θ(n), wherein different frequency domain resource blocks correspond to different values of θ(n).

2. The method according to claim 1, before performing the multiplication operation processing on the to-be-transmitted data on the each frequency domain resource block of the N frequency domain resource blocks, further comprising:

performing a data repetition operation on the to-be-transmitted data subjected to the inverse Fourier transform;

wherein the multiplication operation processing is a dot product operation, wherein the to-be-transmitted data subjected to the data repetition operation is multiplied by an element corresponding to a to-be-multiplied sequence.

3. The method according to claim 1, wherein the multiplication operation processing comprises:

performing a windowing operation on the to-be-transmitted data by using a waveform function.

4. The method according to claim 2, before performing the multiplication operation processing on the to-be-transmitted data on the each frequency domain resource block of the N frequency domain resource blocks, further comprising: performing a filtering operation on the to-be-transmitted data;

wherein the filtering operation processing comprises polyphaser filtering;

wherein a number R of repetitions of the data repetition operation is 2 to the power of i, wherein i is an integer greater than or equal to 0.

5. The method according to claim 1, wherein transmitting the N groups of data sequences comprises:

in a case where N is greater than 1, adding the N groups of data sequences as a first data sequence;

transmitting the first data sequence; and performing a filtering operation or a windowing operation on the first data sequence.

6. The method according to claim 1, comprising at least one of:

a ratio between subcarrier spacing of any two frequency domain resource blocks of the N frequency domain resource blocks satisfying 2 to the power of i, wherein i is an integer; or a ratio between spectrum bandwidths of any two frequency domain resource blocks of the N frequency domain resource blocks satisfying 2 to the power of i, wherein i is an integer; or a ratio between numbers of subcarriers of any two frequency domain resource blocks of the N frequency domain resource blocks satisfying 2 to the power of i, wherein i is an integer.

7. The method according to claim 1, wherein the number K(n) of subcarriers on at least one frequency domain resource block of the N frequency domain resource blocks does not satisfy 2 to the power of i, oversampling inverse Fourier transform is used so that a number of inverse Fourier transform points is 2 to the power of i, and numbers of inverse Fourier transform points used by the N frequency domain resource blocks are the same.

8. The method according to claim 1, wherein performing the inverse Fourier transform on the to-be-transmitted data on the each frequency domain resource block of the N frequency domain resource blocks comprises:

in a case where subcarrier spacing of the N frequency domain resource blocks is equal, but numbers of subcarriers comprised in the N frequency domain resource blocks are different, oversampling inverse Fourier transform is used so that a number of inverse Fourier transform points is 2 to the power of i, and numbers of inverse Fourier transform points used by the N frequency domain resource blocks are the same.

9. The method according to claim 1, wherein a number of inverse Fourier transform points of the inverse Fourier transform is less than or equal to a sum of numbers of subcarriers comprised in the N frequency domain resource blocks; or wherein a number of inverse Fourier transform points of the inverse Fourier transform is less than or equal to two times a number of subcarriers comprised in the each frequency domain resource block.

10. A data modulation method, comprising:

dividing to-be-transmitted data into N groups of data sets, wherein each group of data sets of the N groups of data sets comprises K(n) pieces of to-be-transmitted data, wherein n=1, 2, . . . , N, a value of N is greater than or equal to 1, and a value of K(n) is greater than or equal to 1;

separately performing inverse Fourier transform and multiplication operation processing on the N groups of data sets to form N groups of data sequences; and transmitting the N groups of data sequences;

wherein a to-be-multiplied sequence used in the multiplication operation processing comprises: a sequence of values of which moduli are equal and phases sequentially change by a same θ(n), wherein different groups of data sets correspond to different values of θ(n).

11. The method according to claim 10, before separately performing the multiplication operation processing on the N groups of data sets, further comprising:

performing a data repetition operation on the N groups of data sets subjected to the inverse Fourier transform;

wherein the multiplication operation processing is a dot product operation, wherein the to-be-transmitted data in the N groups of data sets subjected to the data repetition operation is multiplied by an element corresponding to a to-be-multiplied sequence.

12. The method according to claim 10, wherein the multiplication operation processing comprises one of:

multiplying the N groups of data sets subjected to the inverse Fourier transform by each element in a to-be-multiplied sequence; or performing a windowing operation on the N groups of data sets by using a waveform function.

13. The method according to claim 10, before separately performing the multiplication operation processing on the N groups of data sets, further comprising:

performing a filtering operation on the N groups of data sets;

wherein the filtering operation processing is polyphaser filtering.

14. The method according to claim 10, wherein transmitting the N groups of data sequences comprises:

in a case where N is greater than 1, adding the N groups of data sequences as a first data sequence;

transmitting the first data sequence; and performing a filtering operation or a windowing operation on the first data sequence.

15. The method according to claim 10, wherein numbers of pieces of data comprised in the N groups of data sets are different; or numbers of pieces of data comprised in the N groups of data sets are the same.

16. The method according to claim 10, wherein a number of pieces of to-be-transmitted data comprised in at least one group of data sets of the N groups of data sets does not satisfy 2 to the power of i, oversampling inverse Fourier transform is used so that a number of inverse Fourier transform points is 2 to the power of i, and numbers of inverse Fourier transform points used by the N groups of data sets are the same.

17. A data transmission method, comprising:

transmitting to-be-transmitted data in N frequency domain resource blocks, wherein each frequency domain resource block of the N frequency domain resource blocks comprises K(n) subcarriers, wherein n=1, 2, . . . , N, a value of N is greater than or equal to 1, and a value of K(n) is greater than or equal to 1;

performing inverse Fourier transform on to-be-transmitted data on the each frequency domain resource block of the N frequency domain resource blocks to form N groups of data sequences; and transmitting the N groups of data sequences;

wherein the number K(n) of subcarriers on at least one frequency domain resource block of the N frequency domain resource blocks does not satisfy 2 to the power of i, oversampling inverse Fourier transform is used so that a number of inverse Fourier transform points is 2 to the power of i, and numbers of inverse Fourier transform points used by the N frequency domain resource blocks are the same, wherein i is an integer, and the number of inverse Fourier transform points is less than or equal to a sum of numbers of subcarriers comprised in the N frequency domain resource blocks.

18. The method according to claim 17, wherein a number of inverse Fourier transform points is less than or equal to two times a number of subcarriers comprised in the each frequency domain resource block.

* * * * *